(12) United States Patent
McKiel, Jr.

(10) Patent No.: US 9,027,068 B2
(45) Date of Patent: May 5, 2015

(54) METHOD AND SYSTEM FOR ALLOCATING BROADCAST CARRIER RESOURCES

(75) Inventor: Frank A McKiel, Jr., Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 943 days.

(21) Appl. No.: 12/607,462

(22) Filed: Oct. 28, 2009

(65) Prior Publication Data

US 2011/0072475 A1    Mar. 24, 2011

Related U.S. Application Data

(60) Provisional application No. 61/243,710, filed on Sep. 18, 2009.

(51) Int. Cl.
| | | |
|---|---|---|
| H04N 7/173 | (2011.01) |
| H04N 21/2385 | (2011.01) |
| H04N 21/24 | (2011.01) |
| H04N 21/472 | (2011.01) |

(52) U.S. Cl.
CPC ....... *H04N 7/17318* (2013.01); *H04N 21/2385* (2013.01); *H04N 21/2402* (2013.01); *H04N 21/47202* (2013.01)

(58) Field of Classification Search
None
See application file for complete search history.

(56) References Cited

U.S. PATENT DOCUMENTS

| | | | | |
|---|---|---|---|---|
| 5,847,660 A | * | 12/1998 | Williams et al. | 370/227 |
| 2003/0217365 A1 | * | 11/2003 | Caputo | 725/95 |
| 2005/0125832 A1 | * | 6/2005 | Jost et al. | 725/95 |
| 2005/0180568 A1 | * | 8/2005 | Krause | 380/212 |
| 2005/0289618 A1 | * | 12/2005 | Hardin | 725/95 |
| 2007/0204314 A1 | * | 8/2007 | Hasek et al. | 725/100 |
| 2009/0031384 A1 | * | 1/2009 | Brooks et al. | 725/127 |
| 2009/0217326 A1 | * | 8/2009 | Hasek | 725/87 |

* cited by examiner

*Primary Examiner* — Jason K Lin

(57) ABSTRACT

A system instructs that a first carrier signal that is modulated with a first digital media stream be sent to a first receiver, where the first digital media stream uses a first bandwidth. The system receives a second request from a second receiver to send a second digital media stream, where second digital media stream uses a second bandwidth that is greater than the first bandwidth, and determines that transmitting the second digital media stream will require use of the first bandwidth. The system instructs that a second carrier signal be modulated with the first digital media stream and sent to the first television receiver, and sends to the first television receiver an identifier of the second carrier signal as carrying the first digital media stream. The system also instructs that the first carrier signal be modulated with the second digital media stream and sent to the second television receiver, and sends to the second television receiver an identifier of the first carrier signal as carrying the second digital media stream.

25 Claims, 14 Drawing Sheets

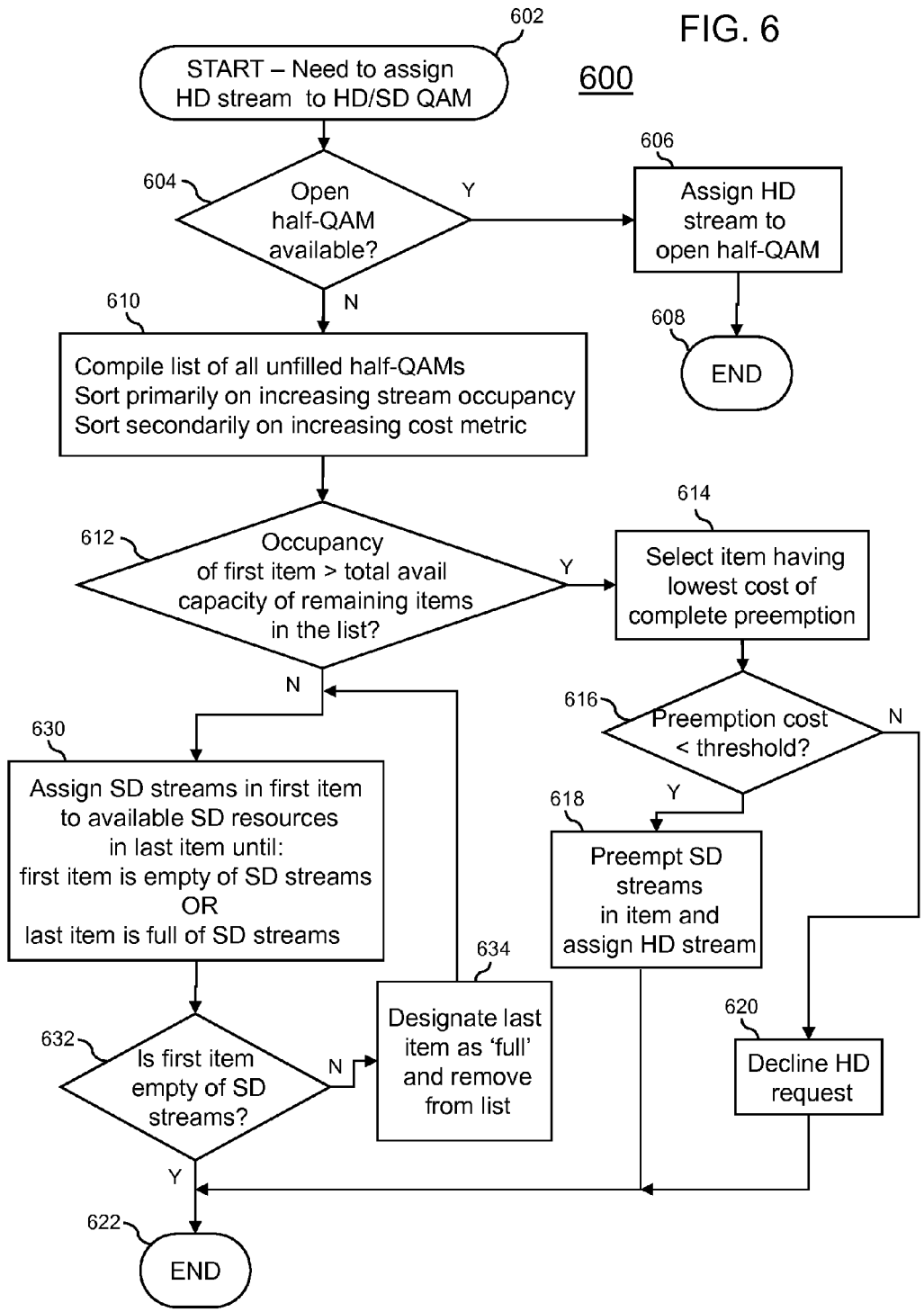

FIG. 7
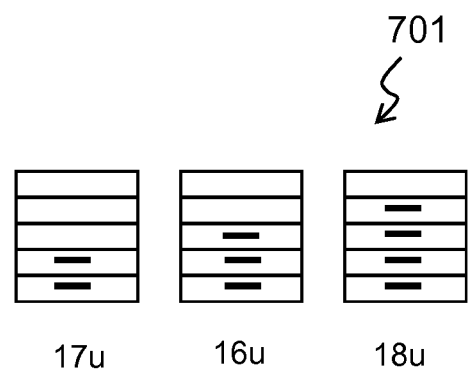
17u   16u   18u
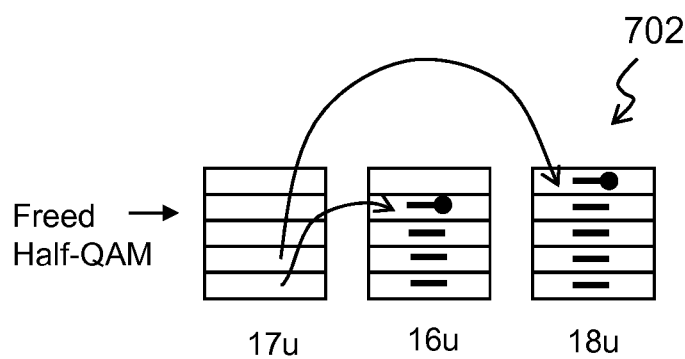
Freed
Half-QAM
17u   16u   18u

'DONOR' SELECTION PROCESS

'ACCEPTOR' SELECTION PROCESS

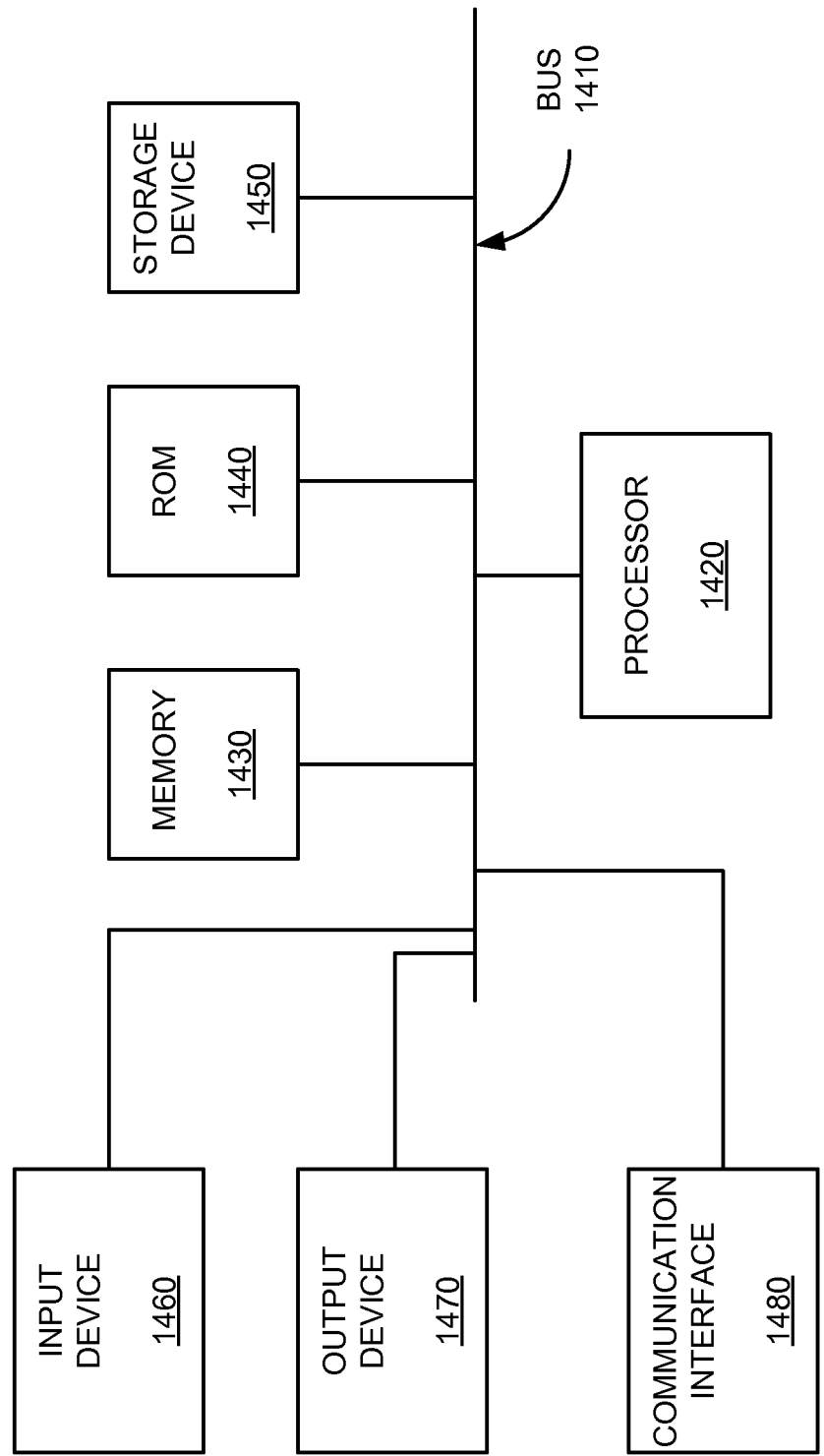

METHOD AND SYSTEM FOR ALLOCATING BROADCAST CARRIER RESOURCES

RELATED APPLICATION

This application claims priority to U.S. Provisional Application No. 61/243,710, filed Sep. 18, 2009, the entire contents of which are incorporated herein by reference.

BACKGROUND

Digital television services have been offered to subscribers by cable television, satellite and more recently via fiber to the home. In the case of cable networks, the signals received by subscribers are typically RF carriers within the range of about 50 to 900 MHz and each carrier is typically modulated with digital data representing one or more programs. In accordance with ITU-T Recommendation J.83, a quadrature amplitude modulated (QAM) format is commonly used such that each RF carrier transmits data at around 38 megabits per second. The modulating signals carry audio-visual data or other information in the form of MPEG data packets. A single modulated carrier may simultaneously transport packets for several program data streams. MPEG data packets belonging to each given audio or video stream are distinguished from each other by a program ID or 'PID' value in each packet. In the industry, it is commonplace to use the term 'QAM' as a noun to refer to a quadrature amplitude modulated carrier itself or to the quantity of bandwidth thereof.

One practice now becoming prevalent to make efficient use of the available distribution infrastructure and carrier resources is called "switched digital video" or "switched broadcast". Conventional broadcasting presents the same programming on a particular dedicated set of channels at all times, which well suits the most popular or mainstream programming such as national network news and primetime shows (from CNN, ABC, CBS, NBC). At any given time, there is likely to be a substantial proportion of viewers watching these programs.

In contrast, switched digital video (SDV) is applied to programming that is less universally popular and may have very specialized, temporary or localized viewership. A switched digital video 'domain' or 'service group' typically encompasses a small subset of a cable network, reaching only a few hundred or a few thousand households. With this technology, an available program is assigned to a broadcast carrier only when at least one subscriber in a service group 'tunes' to the channel, in effect requesting that program. Because this approach uses RF carrier resources only for shows that are actually being watched (in theory), the network operator can rely on the statistical nature of shifting demands to significantly 'oversubscribe' the distribution network. The operator can offer a greater variety of programs without using dedicated channels and by counting on a low likelihood that the number of different shows requested at any time will exceed the overall distribution capacity. The operator can also decide how granular the SDV deployment can be, trading off the costs of maintaining more SDV equipment versus agility to better serve a smaller number of localized subscribers per service group.

Typically, channels to be switched are converted to constant bit rate to facilitate freely switching programming onto RF channels. A given "standard-definition" (roughly 720× 480 pixels) video program may vary in its encoded bit rate due to fluctuations in scene complexity. Through re-encoding and other techniques well known in the art, a standard-definition digital video signal may be "rate clamped" to around 3.75 Mbps while still preserving good quality. At this rate, ten such programs may be transmitted over single 38.75 Mbps QAM. The remaining bandwidth may go toward framing/coding overhead and ancillary data streams. Similarly, each high-definition program can be clamped to a bit rate of around 16 Mbps, allowing a single QAM carrier to carry two high-definition programs.

At any time, the demand for infrequently used or "long tail" content requested by a given population of subscribers may vary. A given program may be assigned to a QAM/PID (that is, an RF carrier and a subset of packets among the data modulating that carrier) if at least one subscriber is tuned to the channel. The same program transmission may be discontinued when no subscribers remain tuned to the given program. This releases RF bandwidth resources to carry other programs for which there is current subscriber demand. At an edge switching device that directs certain streams to selected QAMs, a given QAM has traditionally been statically configured to either carry only standard-definition programs (up to ten) or to carry high-definition programs (up to two).

As subscribers select different ongoing programs to view or select video on-demand programs, the relative demand between standard-definition programs and high-definition programs may shift. An array of QAMs, some configured to carry standard-definition and others to carry high-definition, may be overbooked with standard-definition streams while other QAMs designated for high-definition may remain partially or fully unused (or vice versa). This leads to inefficient use of QAM bandwidth resources and occasional inability to service some subscribers' requests, despite the availability of QAM resources that happen to be configured for a different per-program bit rate. Consequently, there is a need to allow for QAM resources to be dynamically adapted to different per-program bit rates. In particular, there arises a need to coordinate the rearrangement of QAM resources, including mid-program reassignment of programs to RF channels/PIDs. A subscriber's receiver (e.g., a set-top box, television or similar terminal device) will initially be directed to tune to one RF frequency and PID. Then, if the program is reassigned after the initial tuning, the receiver will need to be notified of the RF channel/PID change and retune accordingly.

BRIEF DESCRIPTION OF THE DRAWINGS

FIG. 6 is a flowchart describing a process for reassigning standard-definition program streams from one carrier into other carriers in accordance with a preferred embodiment of the present invention;

FIG. 7 is a graphical depiction of available QAM carrier resources;

FIG. 14 is an exemplary configuration of a device that may correspond to any of a set-top box, an edge switching function, a switched broadcast manager, a switched video analysis server, and/or an edge switching device.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein provide systems and methods that improve utilization of carrier resources. In accordance with some implementations, a given digitally modulated carrier is able to convey standard-definition video streams, high definition video streams, or a combination of both simultaneously. Additionally and/or alternatively, lower bandwidth program streams present on a first digitally modulated carrier may be reassigned to a second digitally modulated carrier to allow the first carrier to accommodate a newly requested higher bandwidth program stream. In conjunction, subscriber receivers actively receiving one of the displaced lower bandwidth program streams may be instructed to re-tune to the frequency of the second digitally modulated carrier. Further aspects may relate to processes to efficiently assign particular program streams to particular carriers.

Figure 1:
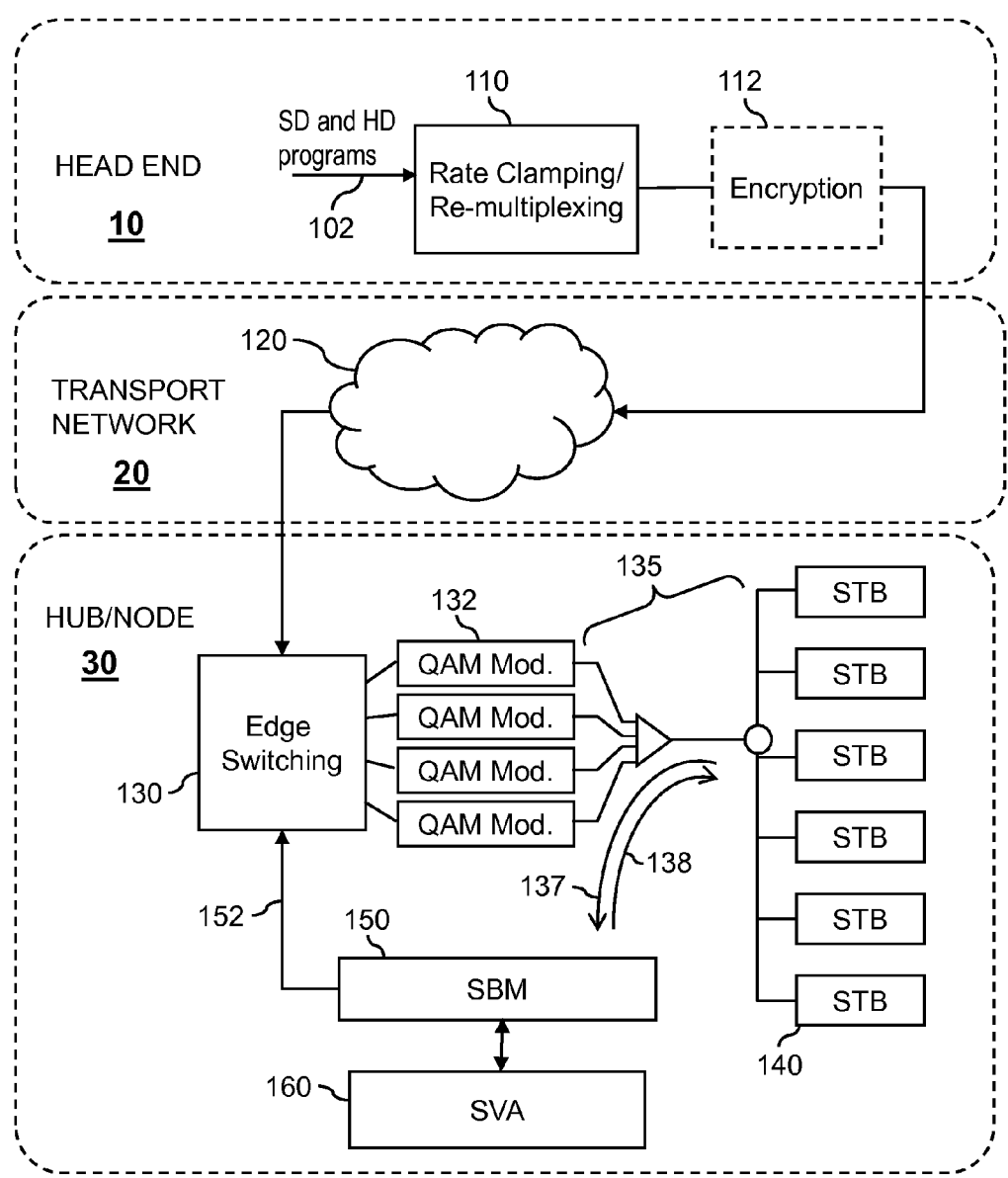
FIG. 1 is a step diagram depicting a typical cable television distribution network.

FIG. 1 shows a typical arrangement that is commonly used to provide services such as 'switched digital video' and 'video-on-demand' in a cable network. Unlike general broadcast services, both of these services involve selectively coupling program streams to RF carriers based on explicit indications from subscribers.

FIG. 1 is shown to comprise three major sections intended to depict the hierarchy of a typical cable distribution network. An upper portion 10, labeled 'head end', refers to the most central point of entry for programming to reach a large population of subscribers served by the network. It is commonplace for a head end of a cable distribution network to serve more than 100,000 customers in a metropolitan area. The middle portion 20, labeled 'transport network', refers to a signal transmission network which may involve electrical cables or an optical fiber communications network which distributes signals from the head end to a number of hubs or nodes each serving a portion of the subscribers serviced via the head end. The lower portion 30 of the diagram, labeled 'hub/node', represents one out of typically many hubs connected to the transport network. A single hub typically supplies signals to numerous nodes which, in turn, may serve hundreds or thousands of subscribers.

In FIG. 1, a variety of program input streams are received at a port 102, including potentially both standard-definition (SD) streams and high-definition (HD) streams. These streams are most often compressed or uncompressed digital signals but can also be analog signals that are to be converted to digital form for transport. The streams may come from a variety of content sources and through a variety of transport mechanisms such as via satellite or through terrestrial packet data networks similar to the Internet. The streams may be encoded in various ways and may exhibit variable bit rates. A variety of encodings and bit rates are well known in the industry. Furthermore, each transport stream may be an aggregate stream carrying multiple programs within a single data stream. All of the streams to be selectively switched onto RF carriers to reach subscribers enter a rate clamping/re-multiplexing function 110. This device is able to perform rate clamping upon variable bit rate streams to yield constant bit rate streams using well known rate clamping technologies. Furthermore, this device is able to extract the individual program streams from aggregate streams that it receives and then selectively recompose or 're-multiplex' new aggregate multiple transport streams from a number of single program streams. One suitable device that is typically used in this capacity is the BMR 1200™ manufactured by BigBand Networks, Inc. of Redwood City, Calif. The rate clamping/re-multiplexing function 110 may at any time be controlled (by other elements as described below) to switch one of the input program streams to be included in the aggregate streams that it is outputting to the remainder of the system shown.

The processed rate clamped and re-multiplexed signals from function 110 may optionally undergo encryption through an encryption function 112. This is commonly done in support of "conditional access," that is, encrypting program streams to control which subscribers are able to view a given program. After streams have been rate clamped, re-multiplexed, and perhaps encrypted, the program streams are distributed to many nodes 30 through transport network 20.

At each node 30, an edge switching function 130 serves to receive such signals and to selectively extract those program streams that need to be distributed to subscribers served by that particular node. One suitable device for fulfilling this edge switching function is the BEQ 6000™ manufactured by BigBand Networks, Inc. This edge switching functionality is accompanied by a bank of QAM modulators 132 which provide the radio frequency carriers that are received by the set-top boxes 140 at each subscriber's location. A network of cables, splitters and amplifiers forms the familiar coaxial cable distribution network 135 that conveys the radio frequency carriers to the set-top boxes for reception at each household. The main role of edge switching function 130 is to selectively couple program streams that are available through network 120 onto specific RF carriers being generated by QAM modulators 132.

Thus far, the path for signals from ingress at the head end 10 to specific set-top boxes 140 has been explained. The manner in which a particular program stream is directed onto a specific RF carrier will now be explained. In the example network of FIG. 1, each set-top box is not only capable of receiving program streams and rendering them as video signals for display to the subscriber, but is also capable of sending control or signaling messages upstream through what is referred to as a 'reverse data path' 137. This upstream messaging may occur using technologies based on DVB/DAVIC (European Telecommunication Standard ETS 300 800) or the DOCSIS standards developed by Cable Television Laboratories, Inc. The implementations of forward and reverse data paths for communication between STBs and network elements are well known and are not explicitly detailed in FIG. 1 for the sake of clarity.

Upstream messaging provides for interactivity between the subscriber and the network, for example, allowing a subscriber to interact with a program guide to order impulse video-on-demand (VoD). In the context of switched digital video (SDV), the reverse channel is used to initiate requests from a subscriber to a controller in the network, such as switched broadcast manager (SBM) 150. A client application operating in the set-top box (e.g., STB 140) of the subscriber detects when a subscriber is attempting to 'tune' to a program that is within the switched video tier. The client application composes and sends a request to SBM 150 expressing what program is desired. SBM 150 may then set about to determine whether the requested program is already available on one of the QAM outputs reaching the subscriber's box. If so, SBM 150 may respond to the set-top box over a forward data channel 138 communicating to the set-top box which RF channel and program ID has been assigned to carry the requested programReturning to the SBM's role in handling the request, if SBM 150 determines that the desired program stream is not already present on one of the RF carriers, SBM 150 may coordinate with the edge switching function 130, via control link 152, to selectively connect the desired program onto an RF carrier that has available capacity to carry the stream. In some cases, this coordination may also need to extend to the rate clamping/re-multiplexing function 110 if the program being requested is not already among the streams being distributed to the transport network 20.

It should be noted that 'tuning' is a term originally applied to analog broadcast television wherein the selection of a program was accomplished by setting the TV receiver to selectively receive a particular RF frequency. In the context of digital television, program selection involves tuning to an RF carrier frequency and demodulating the digital modulation to extract the digital data content in the form of MPEG packets. The digital stream may contain MPEG packets for several different audio/visual programs, so program selection further involves selectively coupling the data from MPEG packets having a particular PID to an MPEG decoder that reconstructs the video images for presentation to the user. As used herein, 'tuning' refers to any and all of these processes for program selection, including the instance in which a viewer selects from among different program streams while staying locked on to a single RF carrier.

'Channel' is another term stemming from conventional analog television. As used herein 'channel' is used broadly to mean either a different RF carrier frequency in some contexts or to mean a selected program stream as perceived by the user. In traditional television, these two meanings were linked together.

Coupled to SBM 150 in FIG. 1 is also a switched video analysis (SVA) server 160. The SVA may monitor and record statistics on the activity of the switched video that can be useful to network engineers to optimize the utilization of RF carrier resources.

It is evident from FIG. 1 that a given set-top box 140 could at any time request a standard-definition or a high-definition program stream. In the prior art, the edge switching function 130 would be configured such that each QAM modulator was dedicated to either carry up to two high-definition streams or to carry up to ten standard-definition streams. The prior art did not allow for a given QAM modulator to be dynamically called into service for either HD, SD, or a mixture thereof. As both viewership and high-definition programming choices expand, the inability to dynamically configure a QAM resource will result in an inefficient use of RF carrier resources and possible denial of tuning requests even when the network at large has sufficient capacity to accommodate the request.

The present invention relates to improved management of bandwidth resources when a varying mixture of standard-definition and high-definition audiovisual signals are being distributed over the resources.

Figure 2:
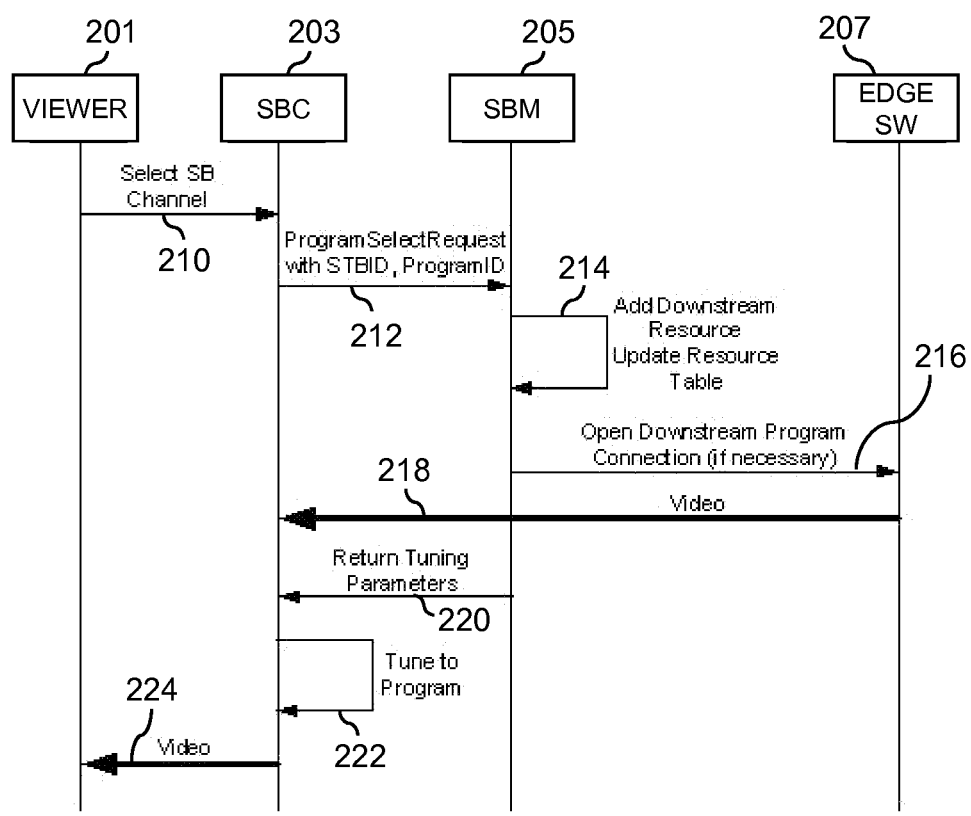
FIG. 2 is a messaging flow among entities in accordance with a switched digital video implementation of the prior art.

The typical process by which a set-top box coordinates with an SBM to request a program stream is depicted in FIG. 2. Entities exchanging messages are shown as viewer 201, switched broadcast client (SBC) 203, switched broadcast manager (SBM) 205 and edge switching device 207. As explained earlier, the latter two entities reside in the cable operator's network. The switched broadcast client 203 may be a software application running in or hosted by the set-top box. In step 210 of process 200, the end user selects a switched broadcast channel and this event is detected by the switched broadcast client 203. In many current implementations, the switched broadcast client or a resident application within the set-top box is able to distinguish full-time broadcast channels from channels that are among the switched broadcast tier. Commonly, data is communicated from the head end to the set-top box receivers describing which user-selectable channels correspond to conventional broadcast versus switched broadcast.

In step 212, the switched broadcast client 203 composes a program select request message identifying both the set-top box that is originating the request as well as the program that is being requested by the viewer. In step 214, the switched broadcast manager 205 determines whether the requested program is already present on a downstream resource (bandwidth on a QAM modulated RF carrier) that is able to reach the requesting subscriber. If necessary, the SBM 205 may newly allocate a downstream resource, if available, to carry the requested program. In step 216, the SBM 205 instructs the edge switch device 207 to couple the selected program to the appropriate RF carrier, assuming that, in this example, the program was not already being sent on an RF carrier reaching the subscriber. In step 218, the video stream data is added to the modulation stream of the RF carrier using the edge switch device 207 and is therefore reaching the set-top box (co-located with the switched broadcast client 203). As yet, however, the set-top box does not have information on which RF carrier frequency the program is assigned to, nor which particular PID-labeled MPEG packets borne by the carrier pertain to the requested program and are to be decoded. Accordingly, in step 220, the switched broadcast manager 205 conveys these tuning parameters to the switched broadcast client 203. The switched broadcast client 203 then interacts with the operating system and hardware in the set-top box to instruct the RF tuner and MPEG decoder to extract the desired video program for presentation to the viewer, which occurs in step 224.

Figure 3:
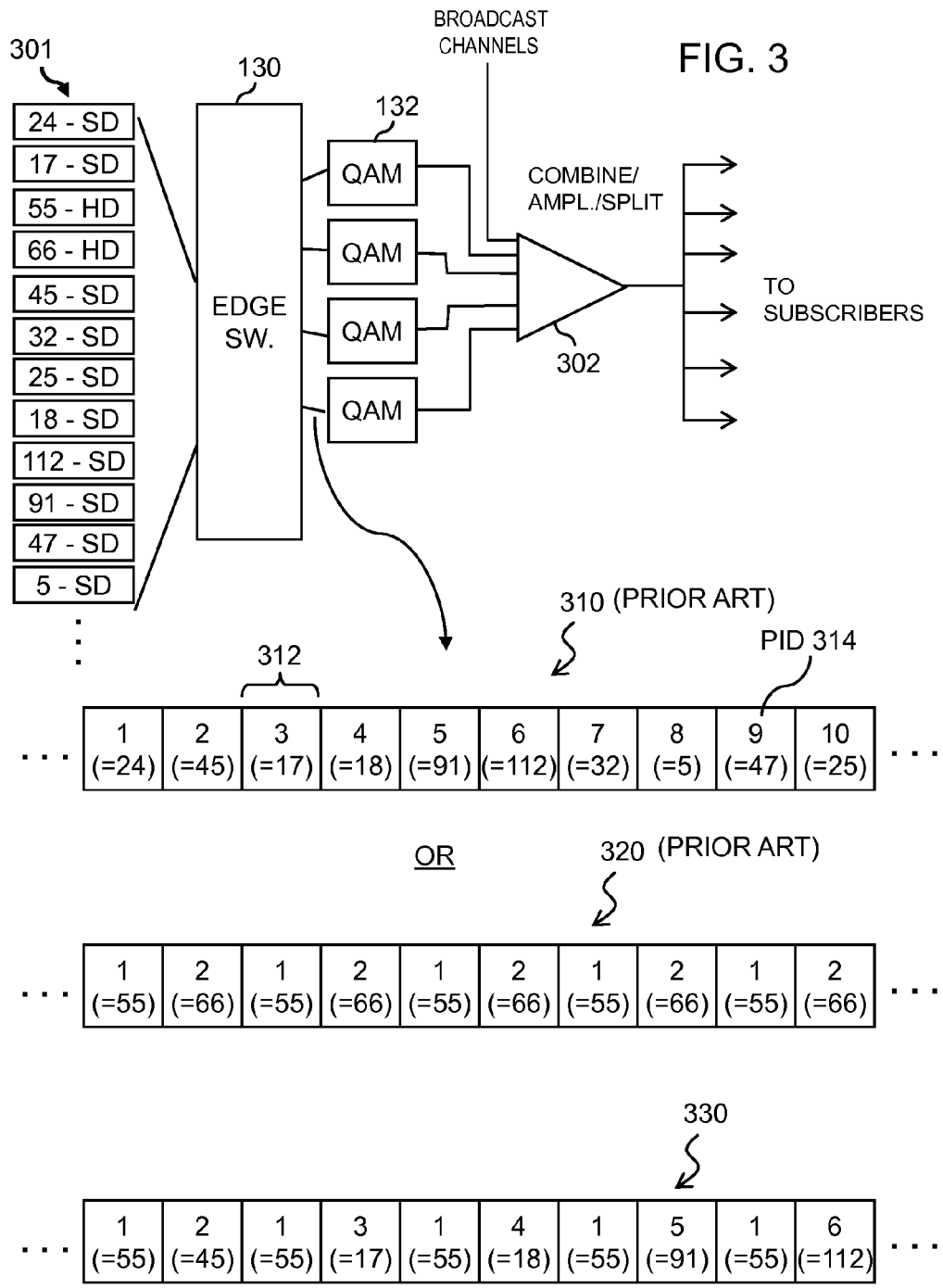
FIG. 3 is schematic diagram depicting an edge switching function multiplexing program streams onto digitally modulated RF carriers.

FIG. 3 depicts the process that occurs at a hub or node for receiving program streams at an edge switch and then causing certain ones of the streams to be multiplexed onto a QAM modulated RF carrier to be transmitted to subscriber receivers. A variety of program streams 301 are assumed to be received via the transport network shown in FIG. 2 as input to the edge switching function 130. Each program stream 301 is identified by an identifier such as a program number. The program streams 301 may also be distinguishable by other mechanisms such as a packet addresses in the transport network. For convenience during the present explanation, each program stream 301 is labeled with an arbitrary identifying number and an indication of whether the stream is a standard-definition video stream (SD) or a high-definition (HD) stream. A single edge switch 130 is typically coupled to a plurality of QAM modulators 132 and the edge switch 130 'maps' available input streams to specific QAM modulators 132 so that specific streams are caused to be modulated onto specific RF carriers. As mentioned earlier, each carrier has sufficient bandwidth to convey up to ten standard-definition streams or as many as two high-definition video streams. The RF carrier signals from the various QAM modulators 132 are then combined to form a composite RF spectrum containing many such RF carrier signals and may also be combined with other RF carriers corresponding to, for example, full-time broadcast channels that are not switched through edge switching function 130. The result is a spectrum of tens or hundreds of "channels" that reaches each subscriber. This composite RF signal is combined and amplified in a combiner/amplifier 302 and perhaps split to different feeds leading into the system of terrestrial cables that branch out to reach each subscriber household.

In FIG. 3, a typical data stream 310 comprising a series of MPEG-2 data packets is shown (in highly simplified form) to be output from the edge switching function 130 and entering a QAM modulator to be modulated onto an RF carrier. Each MPEG packet 312 is designated with a numerical value for a program ID or PID. (For instructional purposes, the header and payload information within each packet and the overhead bytes associated with the transport stream are not shown here. The reader is referred to ITU Recommendation H.222.0, Annex F to better understand the structure of MPEG packets. Furthermore, audio streams and other data associated with a video program are sent as elementary streams within PID-labeled MPEG packets modulated onto the same carrier. However, to simplify the explanation, these accompanying streams are not explicitly depicted herein. These streams are generally much smaller than the video stream and would accompany the video stream as it is switched as described by the present teachings.) While MPEG packets are described primarily herein, the techniques described herein may be equally applicable to other types of packets, such as IP packets.

Data stream 310 mainly shows that ten standard-definition programs are sent using one stream of modulation data in a roughly "round robin" fashion. Although the PID values 314 in each packet are shown numerically from '1' to '10' for simplicity here, the PID values may be arbitrarily chosen by the network element shown or by the entity operating the cable service. The PID values within a given stream of data that is to modulate an RF carrier need only uniquely identify a given stream corresponding to a particular video program. The order of the MPEG packets need not be in a PID-ordered numerical sequence and it is possible that the order of the MPEG packets for different streams might not be interleaved in a strictly sequential or round robin fashion.

Also in FIG. 3, an alternative typical data stream 320 that can be produced at the output of edge switching function 130 is shown to carry two high-definition programs, with MPEG packets for each program being more or less interleaved in an alternating fashion. In this example, each of the two program streams occupies half of the available bandwidth whereas, in data stream 310, each of the program streams only used $1/10$ of the available bandwidth for carrying MPEG packets over the RF carrier.

In accordance with the prior art, a given QAM modulator 132 in conjunction with an output port of edge switch 130 would be arbitrarily and statically assigned to carrying either standard-definition streams only, outputting the signal in accordance with data stream 310, or for carrying strictly high-definition streams in a manner depicted in data stream 320. The prior art has lacked the ability for a single QAM modulator 132 to carry a mixture of SD and HD programming, as depicted by data stream 330, or to dynamically shift between the roles of carrying standard-definition, high-definition or mixture thereof. At the expense of efficient use of QAM bandwidth, this prior art approach has allowed for simplicity in freely engaging or disengaging each SD- or HD-designated resource. In the prior art, displacements of SD streams have not been performed to better accommodate HD streams. Collisions between new HD requests and incumbent SD streams were avoided altogether by segregating carrier resources into SD-only and HD-only capabilities. In contrast, the present invention enables displacement of SD streams among multi-purpose carriers to better accommodate changing demands and achieve higher overall system capacity.

To simplify the current description, the term "half-QAM" will be used herein to signify half the bandwidth of a typical J.83-compliant QAM signal most commonly used in cable networks. A 'half-QAM' is the amount of bandwidth that can accommodate one high-definition stream or five standard-definition streams. Those of ordinary skill will appreciate that the explanation that follows may be applied to the general problem of allocating both 'coarse resource blocks' and 'fine resource blocks' from a common pool of bandwidth resources, where a coarse resource block may be roughly several times as large as a fine resource block.

In the current example, a fine resource block may correspond to the bandwidth of a QAM signal sufficient to carry a single, suitably clamped SD video stream at around 3.75 megabits per second. The coarse resource block may correspond to the bandwidth sufficient to carry a high-definition stream at about 16 Mbps, or roughly five times that of an SD stream. Of course other sizes and ratios are possible in the context of analogous situations where different size units of resource are allocated from a common pool of resources.

Figure 4:
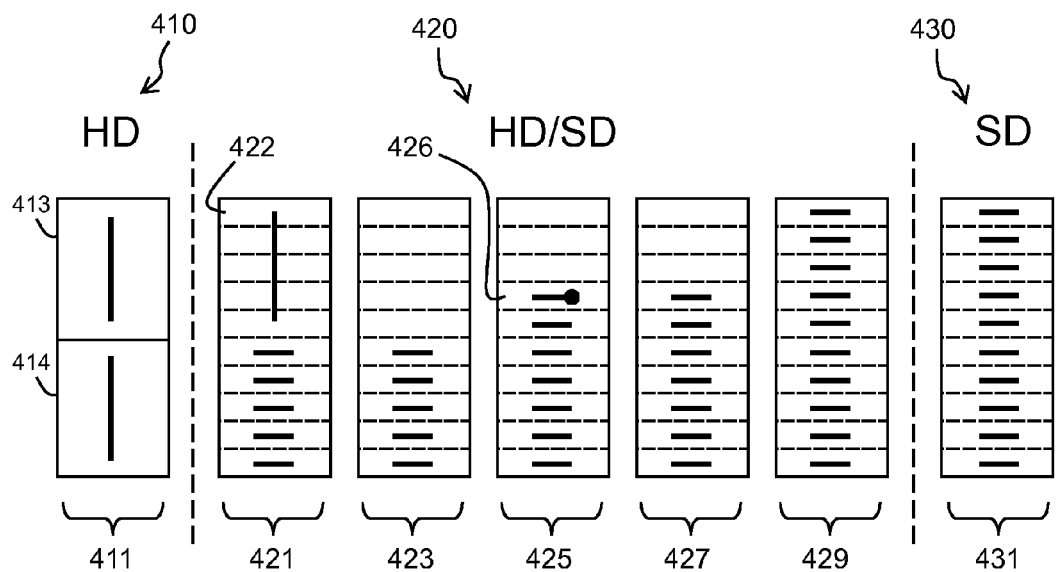
FIG. 4 is a diagram depicting a manner of graphically representing the utilization of RF carrier bandwidth resources.

FIG. 4 is a conceptual drawing of utilization of resources in the form of QAM-modulated RF carriers. Resource utilization chart 400 represents, in this example, the momentary utilization of seven different QAM-modulated carriers. These carriers are divided into three groups: one group 410 is allocated to carrying high-definition streams and another group 430 is allocated for carrying standard-definition streams. In accordance with the present teachings, a third group of RF carriers 420 is designated as being available to carry a mixture of standard-definition and high-definition streams. In FIG. 4, legend 402 explains the convention used in chart 400, as well as in other figures that follow. Referring to this legend, it is evident in chart 400 that, in the example situation shown, a single RF carrier 411 is presently being used to carry two high-definition programs, one being carried in what will be referred to herein as the 'upper half-QAM' 413 and another in the 'lower half-QAM' 414. Note that the blocks 413 and 414 shown do not imply anything about sequencing of the MPEG packets in the aggregate stream. In a practical implementation, these two streams would probably share the data modulation stream in similar fashion to what was depicted in data stream 320. The notion of a 'half-QAM' as used herein is a conceptual tool to facilitate algorithmic abstraction of the carrier resource allocation problem. It is particularly handy due to the fact that the coarse resource block, namely the HD stream bandwidth, happens to consume about half of the available payload bandwidth of a QAM carrier. It should be understood that the present invention is not limited to only manipulating this particular, arbitrarily chosen unit of bandwidth. The present teachings are readily adaptable to other ratios between RF carrier bandwidth and the sizes of coarse and fine allocable bandwidths, such as when data, high definition audio or uncompressed video (or varying levels of compression) are to be combined for transport over the same carrier resources.

On the right side of FIG. 4, a single RF carrier 431 is shown to be designated for carrying standard-definition streams. In an actual deployment, there would likely be many more RF carriers than shown in chart 400, but these are excluded for simplicity in the current explanation. RF carrier 431 is shown to be occupied in carrying nine standard-definition streams with reserve capacity to carry one more should the need arise.

Between the extremes of HD-only carriers (e.g., RF carrier 411) and SD-only carriers (e.g., RF carrier 431), the implementations described herein introduce the context of a group of carriers 420 that agilely support both standard-definition and high-definition streams. In this example, carrier 421 is shown to be fully utilized in carrying one high-definition program along with five standard-definition programs, it being noted that one high-definition program requires the same bandwidth that would be used for approximately five standard-definition programs. In the notation used in chart 400, five SD slots are shown as a single block for carrying a high-definition program, but it should be understood that this notation does not imply that all of the MPEG packets for the HD stream are sent contiguously followed by the MPEG packets for the SD streams. The HD MPEG packets could be interlaced with the SD packets to minimize jitter in packet arrival times.

In the case where the HD stream is assigned PID=1 and the SD streams are assigned 2, 3, 4, 5 and 6 respectively, the actual packet sequence may be as shown in stream 330 of FIG. 3 such that the HD stream (PID=1) is consuming half of the payload bandwidth of the RF channel and conveying packets at five times the rate of any of the other single SD streams.

Likewise, for the other carriers among group 420, carrier 423 is occupied with five standard-definition streams, carriers 425 and 427 are each occupied with seven standard-definition streams, and carrier 429 is fully occupied carrying ten standard-definition streams. Of further note within carrier 425 is one unit of standard-definition bandwidth 426 wherein the SD stream is planned to be moved or has recently been moved onto the carrier, perhaps from some other carrier. The significance of this representation will become apparent through further discussion below.

Upon review of chart 400, it is evident that a number of the RF carriers are carrying fewer than the maximum number of streams that they could carry. It must be kept in mind that the demands for programs can fluctuate considerably and that, although the utilization of a given RF carrier may reach a "high water mark", the viewership of some programs will dwindle and those programs will be eventually discontinued to make way for other streams as demands shift within a service group. Thus, making the most efficient use of carrier resources is not simply a matter of fully occupying one resource to capacity before beginning to occupy the next resource. Consequently, the utilization of a given carrier resource may shift from moment to moment between the extremes of being fully utilized and being completely unutilized.

Figure 5A:
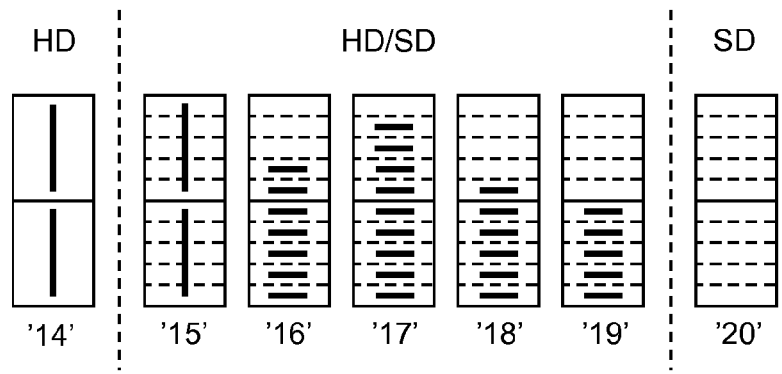
FIGS. 5A-5C provide diagrams showing scenarios of the utilization of RF carrier resources in an example digital content distribution network.
Figure 5B:
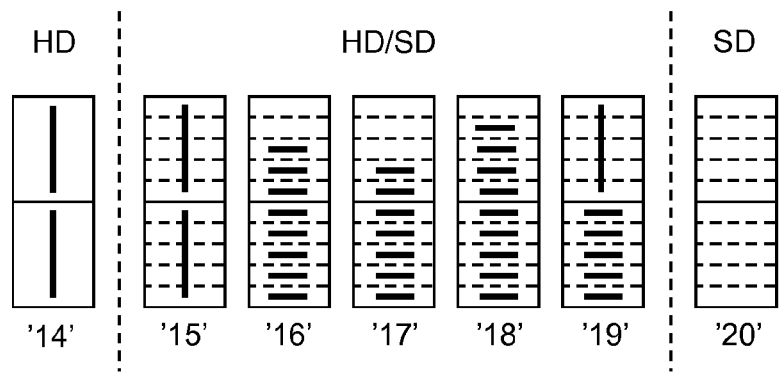
Figure 5C:
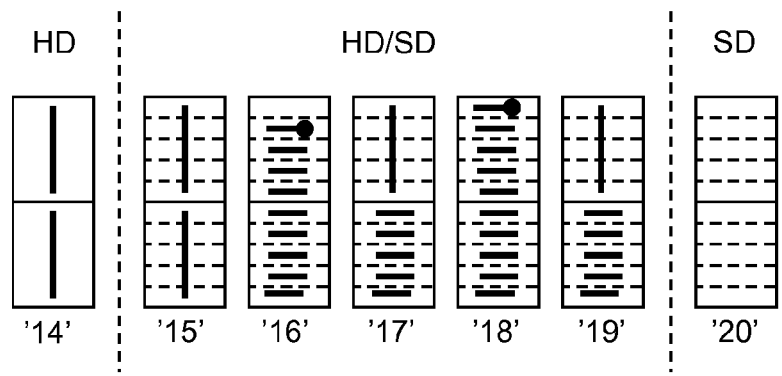

Implementations described herein relate to systems, methods and apparatus to make more efficient use of the collective carrier resources available to carry both standard-definition and high-definition streams while also considering the quality of the video delivery service has perceived by the subscribers. FIGS. 5A-5C illustrate an example scenario wherein effective decisions as to the utilization of RF carriers may improve the efficient utilization of carrier resources.

To illustrate one manner in which the present invention may operate, FIGS. 5A-5C depict a scenario where pre-configured HD resources are filled to capacity and where additional RF carriers that are configured to carry both standard-definition and high-definition streams may undergo a rearrangement of stream assignments to accommodate additional HD streams. Initially, one condition of resource utilization is depicted in FIG. 5A. In this example, one of the RF carriers, arbitrarily labeled "RF Channel '15'", is already consumed with carrying two high-definition streams. RF Channels '16', '17', '18', '19' are presently burdened with carrying seven, nine, six and five standard-definition channels, respectively. As mentioned before, each of these RF channels may have carried more SD streams in the past, but due to attrition of viewership on certain streams, each of these RF channels remains less than fully utilized.

In the prior art, there was not a reason, aside from recovery from failure or maintenance events, to displace an SD stream from one RF carrier to another. In the context within which implementations described herein apply, there are opportunities and useful advantages to moving an ongoing program stream from one RF carrier/PID value combination to another RF carrier and perhaps a different PID value. However, the act of moving a program stream causes subscribers already tuned to the program to the experience a momentary interruption in the program as their set-top box or other receiver tunes to a different RF channel, locks onto the QAM modulation within the channel, and begins buffering and decoding packets of a particular PID value for presentation to the user. The duration of this interruption is anticipated to be comparable to the delay experienced when a user intentionally tunes from channel to channel. Therefore, it is generally desirable to minimize the frequency of such displacements and, when such displacements are to be undertaken, to minimize the number of subscribers briefly impacted by having their set-top boxes perform a re-tuning operation in mid-program. Although infrequent interruptions of this nature would be well tolerated by the general subscriber population, frequent or prolonged interruptions of this nature could aggravate some subscribers and erode the general perception of the quality of the cable media service.

For this reason, the situation in FIG. 5A is not trivially solved by freely reassigning streams to RF channels so that a few channels are preferentially kept fully utilized while others remain empty. Furthermore, when a stream that has been selectively broadcast loses all of its viewership and is to become unassigned, the conceptual bandwidth 'slot' that it vacates is not instantly filled from an active stream on another RF carrier. In accordance with the prior art techniques, the service provider simply waits for a new request for a program and then uses the open slot or any of the other available equivalent resources to assign the newly requested stream.

In contrast to the prior art, the present teachings provide that under certain circumstances some SD streams may be displaced to other RF carriers. This is preferably performed with due consideration for minimizing the impact to viewers.

In FIG. 5A, it is evident that RF Channel '19' has sufficient unused bandwidth to accommodate a high-definition stream. FIG. 5B represents the situation a short time later when a new request for an HD stream has been received and wherein an implementation in accordance with the present teachings has identified this opportunity and indeed used the available bandwidth of RF Channel '19'. RF Channel '19' then conveys one HD stream and five SD streams. In the transition from the situation of FIG. 5A to that of FIG. 5B, as yet no SD streams needed to be moved intentionally, although it may be assumed the natural flux in program requests and viewership have caused some shifts in utilization of channels '16', '17' and '18'.

FIG. 5C represents the situation involving the same set of RF resources some time later when yet another request to accommodate a new HD stream has been received. FIG. 5C essentially represents what would happen if the utilization were as described in FIG. 5B at the moment when the request to accommodate a new HD channel is received. The logic and conceptual data structures to accomplish decisions represented by FIG. 5C are described further below in connection with FIGS. 6 and 7. In FIG. 5C, it is apparent that two streams have been displaced from RF Channel '17' to make room for the new HD stream. One of these streams was moved to RF Channel '18', rendering that channel now fully utilized. The other stream originally on RF Channel '17' was moved to RF Channel '16'. Of course, one of ordinary skill in the art will recognize that there are a variety of possible rearrangements that could have been performed. Some of these alternative arrangements may be more or less desirable than the solution shown in FIG. 5C and, as will be explained further below, much of what drives a decision for accommodating a new request is configurable at the discretion of the service provider. Several adjustable parameters allow a service provider to control the operation of the logic according to the present teachings so as to balance efficient utilization of network resources versus the end-user quality perception and its impact on revenues.

FIG. 6 depicts a process 600 for determining how to accommodate a request for a new HD stream among RF carrier resources that are capable of supporting both HD, SD, and a mixture of these over a single carrier signal. Process 600 commences at step 602, presumably only after all of the other RF carriers that are expressly designated for HD (such as RF Channel '14' in FIGS. 5A-5C) have already been fully utilized. In step 604, the determination is made as to whether any of the RF carriers already have enough unoccupied bandwidth to accommodate the HD stream. If so, then process 600 proceeds to step 606 wherein the HD stream is simply allocated to an available half-QAM, whereupon the process concludes in step 608. The decision logic described thus far is similar to the action reflected in FIGS. 5A and 5B where the sufficient unused bandwidth on RF Channel '19' is identified and utilized to accommodate the new HD stream.

Returning to step 604, if it is determined that no unused half-QAM is conveniently available, then a more involved logical decision is made via the remainder of process 600 to determine if and how to move SD streams among RF carriers in an effort to accommodate the requested HD stream. If the determination in step 604 is that no half-QAMs are readily available, execution proceeds with step 610 to compile a list of all unfilled half-QAMs. A better understanding of this step and other aspects of the following process may be afforded by also referring to FIG. 7.

FIG. 7 represents a conceptual model of the resources, relating to resource charts of FIGS. 5B and 5C, as are relevant for decision-making purposes in determining how to accommodate the new request. This conceptual model may correspond to a data structure such as a table or linked list in an actual implementation in accordance with the present teachings, but is shown here primarily for instructional purposes, especially in conjunction with the flowcharts of FIG. 6 and other figures. In this particular instance, chart 701 reflects a focus on the subset of FIG. 5B that is important for the decision making process. Recall that, by the action in step 604, any of the RF carrier resources that might have had sufficient bandwidth to carry an HD stream without displacing any SD streams have already been exhausted.

To clarify more generally how a given situation on an RF carrier is represented in this depiction, the following table ("Table 1") describes how QAMs having different levels of utilization are to be represented in the list compiled in step 610 and/or converted to the form depicted in FIG. 7.

TABLE 1

| Number of streams on QAM | List as |
| --- | --- |
| 0 | 2 fully open half-QAMs |
| 1-4 | 1 open half-QAM + 1 partially filled |
| 5 | 1 open half-QAM |
| 6-9 | 1 partially filled half-QAM (other half is unavail.) |
| 10 | (Do not list-no availability) |

In FIG. 7, a conceptual chart 701 of resource utilization shows only the unfilled half-QAMs that are in the pool of resources for RF Channels '15' through '19'. The remaining half-QAMs, that is, both conceptual halves of RF Channel '15' and '19', the 'lower' half-QAMs of RF Channel '16', '17' and '18' are fully occupied and of no use for accommodating the new HD stream unless one intends to entirely preempt other streams. (As mentioned earlier, references to 'upper' and 'lower' half-QAMs herein are merely conveniences for modeling resource utilization and are unrelated to the assignment of PID numbers, the ordering of MPEG packets in the stream, precedence or priority for packet forwarding, etc.)

Accordingly, the subset chart 701 shows an extracted view of just the three half-QAMs that need be considered during the decision-making process of process 600. In accordance with step 610, the list of unfilled half-QAMs is sorted primarily based on increasing stream occupancy. Furthermore, where two half-QAMs have the same stream count, this list is to be sorted secondarily in order of increasing cost metric, as will be described shortly. In the present example, there are only three items in the list to be considered, and they are sorted left to right in order of increasing occupancy.

Returning to process 600, the list of half-QAMs having some resource availability, as compiled in step 610, is reviewed in step 612 to initially assess whether it is even possible to accommodate the newly requested stream based only on currently open resources, that is, without actual preemption or discontinuation of existing streams. In step 610, the occupancy of the first item in the list (which by virtue of the sort order should be the lowest occupancy of any of the available half-QAM resources) is compared to the sum of all unutilized bandwidth on all of the remaining half-QAMs in the list. If the occupancy of the first item exceeds the total available capacity among all of the other half-QAM resources, then accommodating the new bandwidth request would require eliminating other streams either within the first half-QAM in the list or elsewhere. A service provider may simply configure the system to never 'bump' existing streams and simply configure the logic to reject the new stream request. Another alternative is represented by steps 614 through 620, wherein streams that are occupying bandwidth among the RF carriers are evaluated and ranked in terms of lowest cost of preemption. In practical terms, low cost of preemption may correspond to extremely low viewership of a particular stream, low revenue associated with the stream, low expectations on the part of the viewers (different subscribed grades of service), anticipation of rapidly diminishing viewership as a function of time of day or program type. (A more thorough discussion of preemption logic is described later in connection with FIG. 12.)

Once bandwidth resources, such as half-QAMs with some potentially preemptible streams, are identified in step 614, step 616 is performed to gage whether the cost of preempting some streams to accommodate the new request exceeds a threshold set at the discretion of the service provider. If the preemption cost is tolerable due to, for example, only impacting a small number of streams and the streams having very low viewership, then decision step 616 may lead to the execution of step 618 wherein the lowest cost SD streams are preempted. In the alternative, it is conceivable that there are resources among the "SD only" RF carriers that could receive the displaced streams. The logic presently being described assumes that those resources have already been considered and are fully utilized and unavailable or that, according to service provider preferences, it is undesirable to displace streams into the "SD only" carriers. Accommodating a new request can involve a mixture of preemption and displacement decisions. Upon review of the entire teachings presented herein, one of ordinary skill in the art will recognize that cost metrics or the like may facilitate evaluation of what combination of displacement and preemption is appropriate or desirable under any situation of existing loads and new program requests. The service provider may control which logic to apply in handling such situations.

Whereas step 618 deals with preemption of at least some standard-definition streams to accommodate the high-definition stream, it is also possible that in step 616 the cost of preemption exceeds an acceptable threshold and the request to accommodate the HD stream is declined in step 620. In either case, the process concludes in step 622. In other words, the user requesting the new HD stream may experience delay before the HD stream can be received or may receive notification that the program is simply not available at that time.

Returning now to step 612 of process 600, if the occupancy of the first item in the list (depicted conceptually in chart 701) is less than or equal to the available capacity of the remaining items in the working list, then step 630 is executed to systematically assign each SD stream in the first item to an available bandwidth slot within the remaining items. In particular, in accordance with one approach, the SD stream in the first item is preferentially assigned to available bandwidth slots in the last item in the list, the last item having generally the highest utilization.

This approach encourages complete filling of half-QAMs that are already nearly full. The main advantage to this preference is that half-QAMs of lower utilization tend to remain at low utilization, reducing the potential impact of future SD stream displacements to service subsequent HD stream requests. In other words, this behavior increases the chances that, by the time another HD stream request is received, a lower utilization half-QAM will either spontaneously become completely open or will remain at such low utilization as to be a good candidate for displacing a low number of SD streams to accommodate the next HD stream request.

In addition to observing utilization levels on each RF Channel, step 630 may also take into account a more insightful set of considerations for deciding which SD streams to displace and which of the displaced SD streams should be assigned to which of the available bandwidth resources, as will be explained further below along with FIGS. 9 and 11.

In step 630, the process of moving SD streams from the first item in the list to available bandwidth allocations in the last item continues until the last item is fully utilized or the first item is no longer occupied with SD streams. In step 632, it is determined whether the first item is now completely unoccupied or whether additional SD streams are still assigned to the first item and need to be displaced. If there are residual SD streams as determined in step 632, then process 600 proceeds with step 634 to designate the last item in the list as now being full and effectively removing it from the list as no longer having any available bandwidth slots. The execution of process 600 then returns to step 630 to continue moving SD streams from the first item to available bandwidth in the remaining items in the list that was compiled in step 610. When, in step 632, it is determined that all SD streams that were once occupying the first item have now been displaced to other resources, process 600 concludes in step 622.

As process 600 is executed in the particular context of FIG. 5B, chart 702 of FIG. 7 reflects the resulting decision to move SD streams out of RF channel '17', with one SD stream going to RF channel '18' and the other going to RF channel '16'. This frees a half-QAM in carrier '17' so that it may now handle an HD stream.

Note that the actions described for many of the steps in process 600 may refer to the real-time actions of moving SD streams to other RF carriers and dispatching control commands to elements as the process is executed. Alternatively, process 600 may be executed to compose a tentative plan for moving SD streams and reserving the resources to do so. The control signaling and other processes to invoke the course of action decided by process 600 may take place somewhat after the decision process 600 has been executed.

Figure 8A:
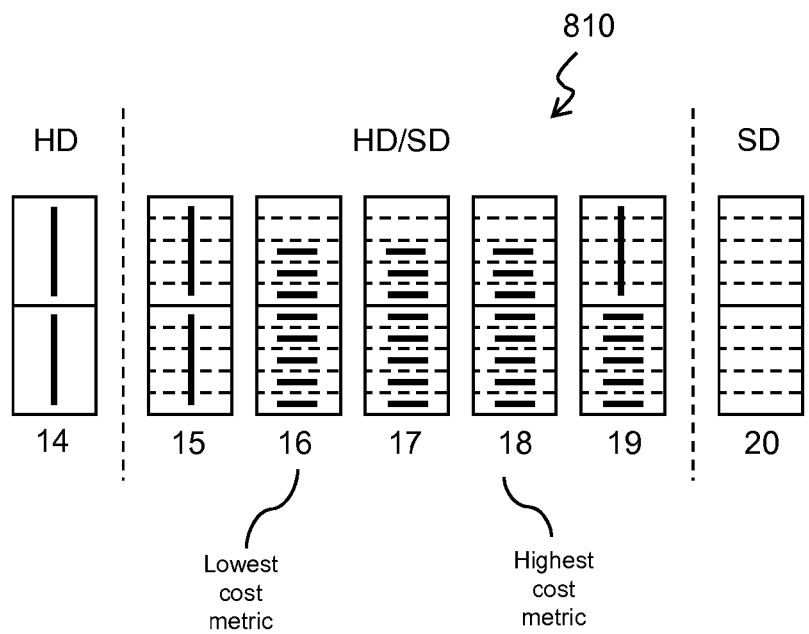
FIGS. 8A and 8B are diagrams showing a scenario involving the utilization of RF carrier resources in an example digital content distribution network.
Figure 8B:
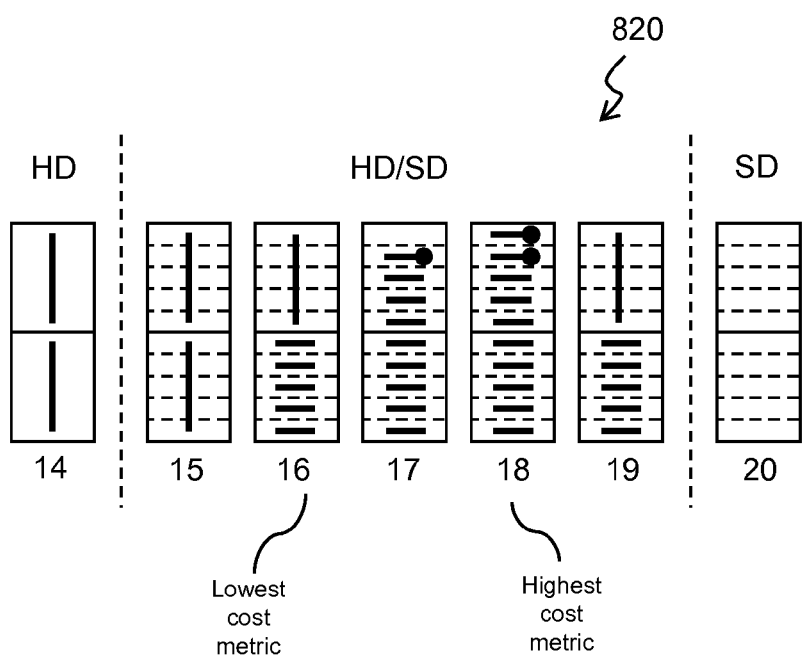

FIGS. 8A and 8B present a pair of resource utilization charts. Chart 810 depicts a resource utilization scenario wherein five RF carriers are heavily utilized, each one or being fully occupied or very nearly so. In chart 810, it is evidence that RF channels '15' and '19' are already fully utilized and that RF channels '16' and '17' are each carrying eight SD streams, while RF channel '18' is carrying nine SD streams. Chart 820 represents the resource utilization scenario after a process (to be described below) makes a decision to rearrange SD streams in response to the request for a new HD stream when confronted with the situation presented in chart 810. Chart 820 demonstrates that the upper half-QAM of RF channel '16' is vacated to make room for the new HD stream. Of the three SD streams that were previously occupying the upper half-QAM of RF channel '16', two are assigned to complete the utilization of RF channel '18' and a remaining displaced SD stream is assigned to RF channel '17'.

Even though a similar end result might have been achieved by distributing the SD streams out of RF channel '17', for example, to its neighboring channels, the choice of vacating channel '16' versus channel '17' may be driven by other factors. If one only regards the occupancy level of channels '16' and '17', they are equivalent on that basis. However, some additional considerations to influence the choice of channel '16' versus channel '17' may relate to what specific stream or program is being switched. For example, a stream having a high viewership at the time that the stream would need to be displaced would create a disturbance to more viewers than a stream with very few viewers. Moving a stream with very few viewers would have a lower overall impact on the community's perception of service quality. Aside from measuring viewership in real-time, a service provider may have very well-characterized importance of the given stream in terms of viewership, loyalty, revenues for premium programming, viewer age group, etc. and any of these parameters may vary as a function of time-of-day or day-of-week. Some streams are better candidates than others to suffer a momentary disruption by being displaced to a different RF carrier. Consequently, a half-QAM carrying one or two high-value streams, with high viewership and primarily viewed by the age group that in fact pays for the cable service, might be left untouched in favor of displacing three or four SD streams in another half-QAMs where the viewership is minimal in numbers or of such a young age that the momentary disruption for re-tuning is of no consequence.

Yet another facet worthy of consideration relates to perceived continuity of a given stream. If a given stream is being viewed by an audience and experiences two disruption events an hour part from each other, it is likely that many viewers will not find this objectionable. (Of course, this may depend on the particular program being watched and at what point the program the disruption occurs.) Late-night viewers may find momentary disruptions generally less objectionable than 'prime time' viewers, and may be more tolerant of more frequent disruptions. Momentary disruptions within a few minutes of each other are more likely to attract attention by viewers and lead to a sense that the service is unreliable. The viewers will tend to assume that there is a problem with network transmission when really the network is merely rearranging its utilization of carriers as part of its normal operation. Finally, two or three disruptions occurring within, say, a few seconds after an initial placing of the stream onto given RF carrier could be perceived as just artifacts of the initial tuning. It may be somewhat less objectionable if the re-tunings are bunched within the first few seconds of being on the stream as opposed to being spread out over the first few minutes of viewing the stream. The time since the last re-tuning of a stream, therefore, can be configured in accordance with the present teachings to influence the selection of which existing SD streams are better candidates to be displaced.

Even more granular considerations can influence which SD streams are to be displaced to make room for HD streams. Aside from considering stream-wise statistics at large, a more sophisticated system may also consider the user experience for individual subscribers. Some subscribers may subscribe to a premium 'class' or 'grade' of service to improve their quality of service in general. In the present context, one component of an elevated grade of service may be fewer disruptions. As a process compares SD streams that are candidates to be displaced, the process may review the list of subscribers currently viewing a given stream and determine a cost metric indicating the relative undesirability of displacing the given channel. As used herein, the term 'cost metric' may refer to a relative value merely for comparisons, it does not have to represent actual dollar costs or revenues lost, and it can be unit-less.

Aside from just generally considering an individual subscriber preference to avoid disruptions, the present teachings also provide for keeping track of the time that has transpired since a given user experienced a disruption event such as a previous SD stream displacement event. In considering moving an SD stream currently being viewed by a large number of subscribers who have recently experienced other SD tuning events, it may be preferable to select a different SD stream where the majority of current viewers have not experienced any recent disruptive amounts or have subscribed to a class of service where they are tolerant to such events.

Yet another facet for consideration on a per-subscriber basis may relate to the type of receiving device being used. For example, some devices receiving the RF carrier signals may perform re-tuning in a much less disruptive fashion. This may be by virtue of using multiple RF tuners and MPEG decoders so that re-tuning can be achieved more seamlessly. The viewer may be tuned to a given RF carrier and watching a particular program. Slightly in advance of their program stream being dropped from the current RF carrier, the network may establish the same program on a different RF carrier, instruct the subscriber's secondary tuner to tune to the second RF carrier and begin the process of buffering and decoding the MPEG packets. At some point, the video being presented to the viewer switches to the signal provided by the secondary tuner and MPEG decoder, so that the disruption to the end-user is minimal. Now considering the decision-making process within the network for moving or displacing a standard-definition streams, the network can determine or maintain a record of whether each receiver is of the type to function in this manner and reduce disruption to the subscriber. An SD stream that is currently being viewed by large proportion of these fast tuning (or deeper buffered via RAM or hard drive) boxes would have a lower cost metric for displacement in terms of eroding the user perception of network quality. Depending on implementation, this 'seamless displacement' approach may slightly delay honoring the new request as incumbent streams are more gracefully transitioned.

Figure 9:
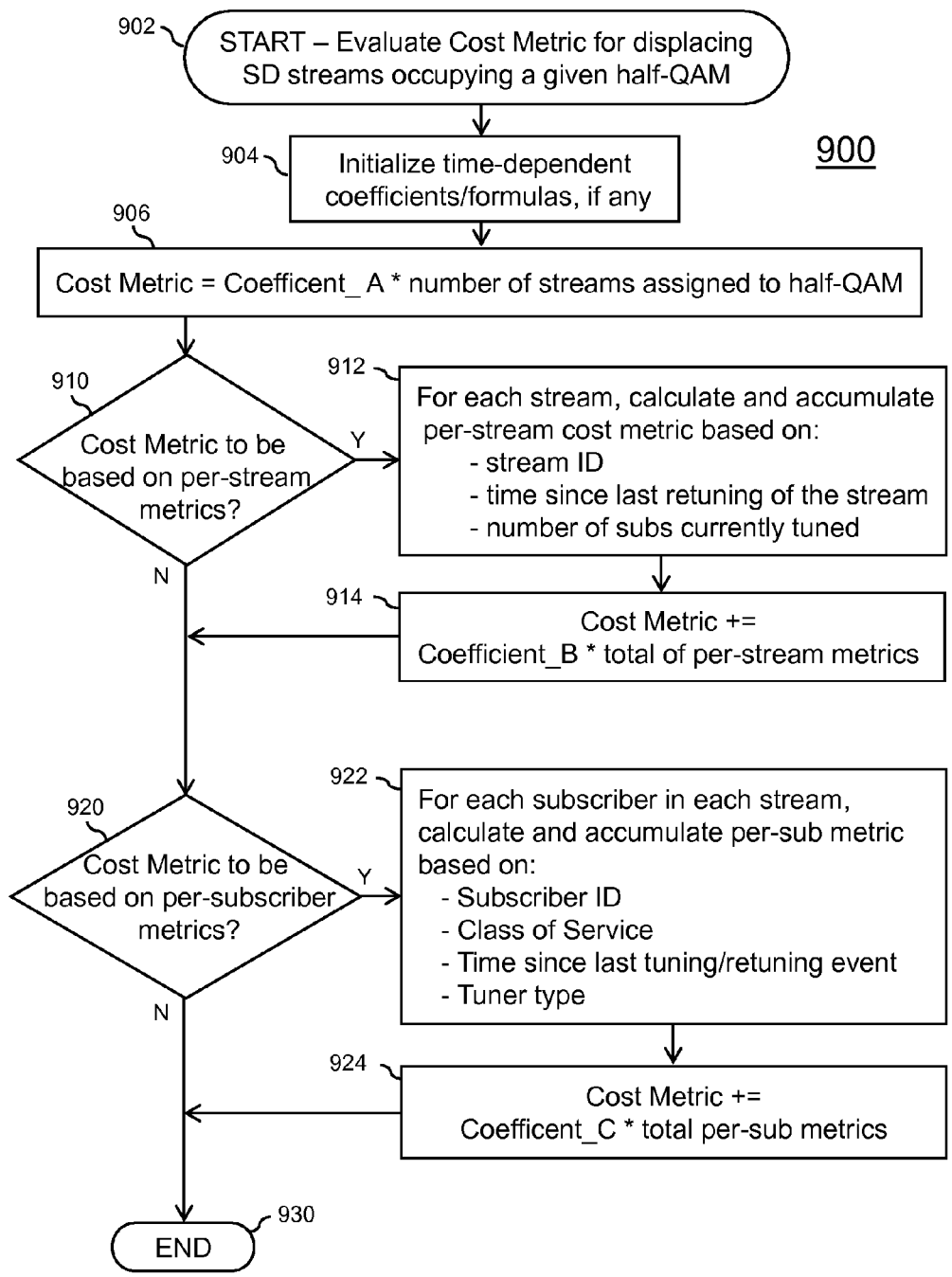
FIG. 9 is a flowchart describing a process, in accordance with a preferred embodiment of the present invention, for evaluating the streams currently assigned to a carrier resource to determine their suitability for being displaced to other carriers.

In accordance with the foregoing, FIG. 9 is a flow chart depicting a process 900 for evaluating which of several partially filled half-QAMs are best candidates to have all of the currently assigned SD streams displaced to the carriers. As mentioned earlier, this is one way to perform a more sophisticated reassignment of streams as might occur in step 630 process 600 shown earlier. Process 900 commences in step 902 to evaluate the relative cost metric for a given half-QAM based on the SD streams that are currently occupying its bandwidth resources. Process 900 may continue to step 904 wherein any of the time-dependent coefficients to be described or utilized in the subsequent steps are initialized based upon the time-of-day, day-of-week, calendar date etc., to the extent that some coefficients depend on those values. Aside from multiplication coefficients depicted herein for discussion purposes, it should be understood that any parameters, whether additive, exponential, transcendental, etc. or even switching among different functions or formulas could be made to change as a function of time, either in a preprogrammed fashion or adaptively such as by the action of, for example, a moving average in response to recent monitoring of viewership, channel change volumes, etc. The following explanations based on cumulative factors and multiplicative coefficients are by way of example only and are not to limit the invention to only these forms of calculation.

In step 906, the extent to which just the quantity of streams momentarily assigned to a half-QAM influences the cost metric may be determined by Coefficient_A, which is a parameter that can be adjusted by the service provider. Coefficient_A may even vary as a function of time. The service provider can set this Coefficient_A to '0' such that the number of streams alone is not taken into consideration all. In the other extreme, the service provider can set this coefficient so high, relative to the other coefficients described below, that the number of streams assigned to the half-QAM is very important or overwhelming compared to the other factors. For convenience, no conditional step is provided for deciding whether or not to even perform his calculation because it is of minimal burden. In contrast, conditional steps 910 and 920 are included so that the much more involved calculations on a per-stream or per-subscriber bases are not performed at all if the influence (determined by the coefficients 'B' and 'C') of these considerations is intentionally minimized by configuration chosen by the service provider.

Following step 906, step 910 may be performed to determine whether the evaluation is to take into account any per-stream metrics. If not, the execution simply proceeds to step

920. Otherwise, process 900 proceeds to step 912 to calculate the cost metric by summing, for each stream, a cost as a function of a stream identifier, the time since last re-tuning of the stream and the number of subs currently tuned. Of course, it should be understood by those of ordinary skill that any of these factors are optional and subject to system design and service provider configuration. Furthermore, other factors on a per-stream basis may be taken into account and the relative weights of these various factors and the functions of cost metric as a function of any one of these parameters is subject to variation in design at the discretion of the service provider to improve decisions regarding which half-QAM to vacate. In step 914, after considering all of the streams occupying the half-QAM, a composite cost metric may be assembled, multiplied by Coefficient_B and then added to the overall cost metric. Execution may then proceed to step 920. Note that the service provider/network operator can vary the relative importance of the occupancy counts versus per-stream metrics by adjusting the relative values of Coefficient_A and Coefficient_B.

In step 920, the determination may be made as to whether cost metrics are to be considered to the level of granularity of individual subscribers. If not, then process 900 simply concludes with step 930. Otherwise, process 900 may proceed to step 922 wherein a cost metric for each subscriber currently tuned to an SD stream within the candidate half-QAM is evaluated and added to a cumulative cost metric for all of the subscribers being served by the half-QAM. The cost metric for each subscriber may take into account subscriber ID, class of service, time since last tuning or re-tuning event experienced by the particular subscriber, and/or tuner type, i.e. whether the tuner performs minimally disruptive re-tunings. Of course, it should be understood by those of ordinary skill that any of these factors are optional, that yet other factors on a per-subscriber basis may be taken into account, that the relative weights of these various factors and the dependence of cost metric as a function of anyone these parameters is subject to variation in design at the discretion of the service provider to improve decisions regarding which half-QAM to vacate.

Once the cost metrics for every subscriber have been accumulated in step 922, then (in step 924) the cumulative cost metric may be multiplied by Coefficient_C and added to the overall cost metric as may have been established by steps 906 and 914. Coefficient_C provides the service provider yet another configurable parameter by which to modulate the relative weighting of per-subscriber considerations versus per-stream metrics and raw occupancy levels in the half-QAM. Process 900 concludes in step 930, yielding a relative cost metric for a half-QAM in consideration of displacing the SD streams that it currently services.

Returning briefly to FIG. 8A, it is noted that RF channel '16' has a lowest cost metric compared to RF channels '17' and '18'. This cost metric calculated for each of the RF channels can be calculated using the process 900 as just described. This secondary ranking on the basis of cost metric (see step 610 shown earlier) makes the upper half-QAM of RF channel '16' a better candidate 'donor' than that of RF channel '17'. The differentiating cost metric may have been calculated, for example, in consideration of the number of viewers currently tuned to the particular streams in these RF carriers. So as the process 600 is carried out, a calculation as described in process 900 may be performed in the course of executing step 610 to exercise further selectivity over which half-QAMs are vacated.

Figure 10:
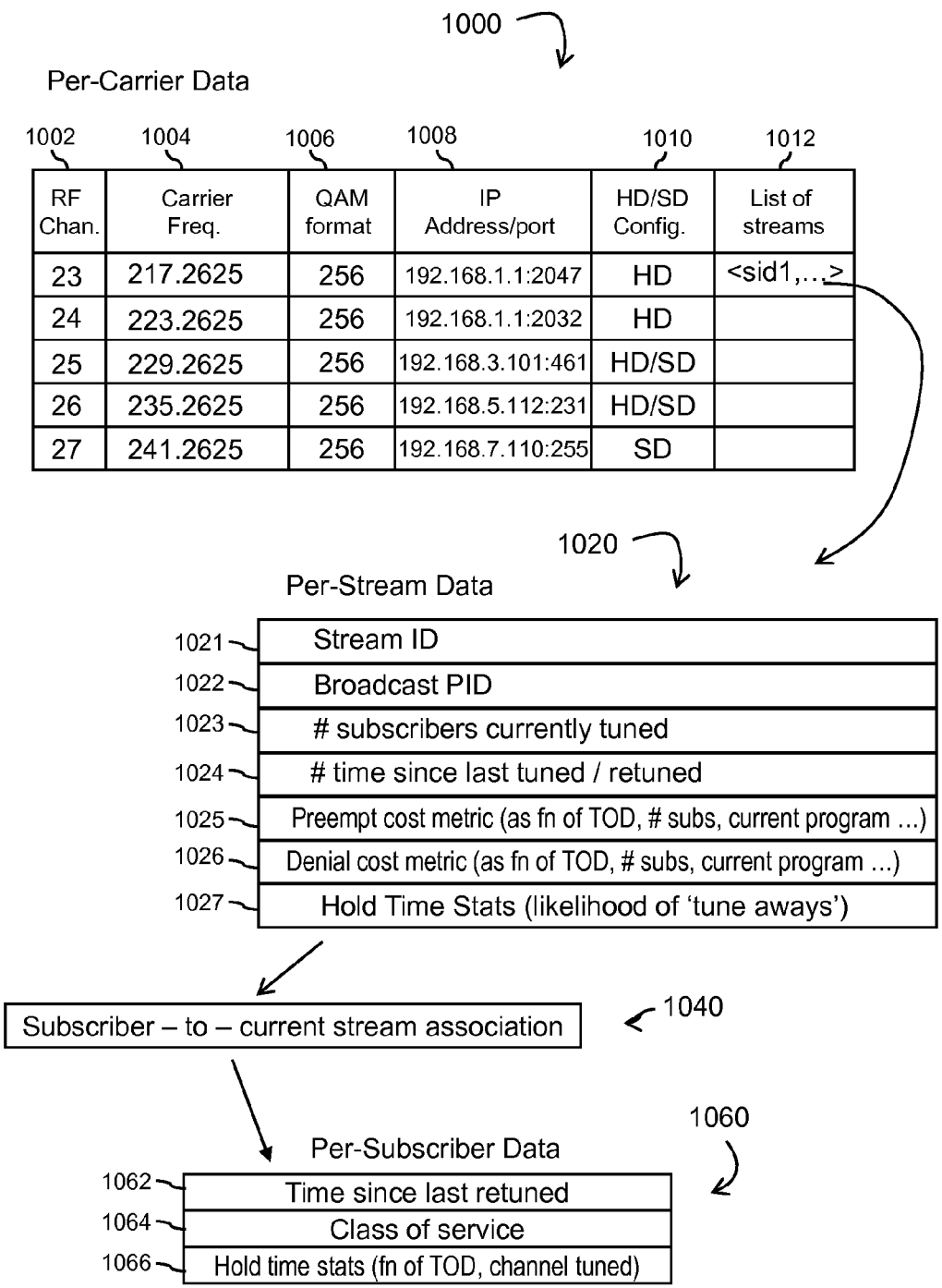
FIG. 10 is a schematic depicting data structures in support of processes to assign program streams to carriers in accordance with a preferred embodiment of the present invention.

In conjunction with process 900 for calculating cost metric, FIG. 10 depicts exemplary data structures to be maintained in support of cost metric calculations. Of course, the data structures depicted in FIG. 10 are shown by way of example. An actual implementation may employ a greater or lesser number of parameters and the data may be organized differently than as shown. Table 1000 may be referred to as a "per-RF-carrier" configuration table. For each row in the table corresponding to a RF Channel number 1002, there is listed a corresponding unique carrier frequency 1004, a QAM format (64-, 256-) 1006, possibly an IP address/port 1008 by which to address communications to modulate the RF carrier, and an HD/SD configuration value 1010 relating to whether the RF carrier is designated for HD only, SD only, or for agile HD/SD service. Finally, within this table, or in an associated table or linked list for example, may be a list of streams that the RF Channel is presently carrying. This list of streams is useful, for example, as input in step 610 or step 906 described earlier.

Another data structure depicted in FIG. 10 is a per-stream data table 1020 for holding data associated with each stream independently of which, if any, RF carrier the stream may be assigned to at any moment. The example data items are shown to include, for each stream, the stream identifier 1022, the program ID (PID) 1024 currently used for the stream, the number of subscribers currently tuned to the stream, the time elapsed since the stream was re-tuned (previously displaced) or was initially introduced onto a carrier within the switch broadcast network. Some further per-stream data that will be described further below relates to a preemption cost metric, a denial cost metric, and hold time statistics. Each of these may vary as a function of time of day, number of subscribers currently tuned, the particular program or type of program being watched, etc. A denial cost metric may be similar to a preemption cost metric, the main difference being that denial affects a subscriber making a new request whereas preemption affects perhaps many subscribers already viewing the identified program stream. The denial cost of one stream may be compared against the preemption costs of another stream, for example, in performing step 616 shown earlier.

Yet another data structure depicted in FIG. 10 is a 'binding' or association data structure 1040 indicative of which subscribers are currently tuned to each active stream. Devices that would maintain such information include a Switched Broadcast Session Server (SBSS) or a Switched Video Analysis platform (SVA) both offered by BigBand Networks, Inc. In support of step 922 described above, the binding data in table 1040 allows for a deeper, subscriber-level assessment of candidate half-QAMs to be used to accommodate new stream requests. Data structure 1040 may be organized as a list of stream identifiers, with each having a list of subscribers, or as a list of subscribers with each having an entry representing the stream that they are currently receiving. This structure is populated based on stream requests received and may also be maintained by polling receivers to verify current stream selection. This association information may also be contained in a 'list of subscribers' field within data structure 1020 or in a 'channel currently tuned' filed in data structure 1060. Those of ordinary skill will recognize the value of various design approaches to achieve desired efficiency in traversal of the data structures and processing of the data.

The last data structure depicted in FIG. 10 is a per-subscriber data table 1060 which maintains information about a given subscriber (or corresponding STB receiver) independently of which stream or RF carrier to which the subscriber is currently tuned. This data structure may contain for each subscriber, for example, time since the last re-tuning event that the subscriber experienced 1062, class of service for the subscriber 1064, and behavior characteristics 1066 related to hold time of the subscriber on selected streams. The latter may vary as a function of time of day or the program being watched by the subscriber. As will be described later, it may be useful to know whether the viewer tends to stay tuned a given program for a prolonged period or whether the viewer's style is more transient. This information about each subscriber rolls up into an evaluation of average hold times on given streams and provides insight on the likelihood of stream being abandoned by all viewers in the near future so that the bandwidth resources can be freed up to service other requests.

As mentioned earlier, the processing steps 610 and 630 present opportunities to employ more sophisticated analyses in deciding how to, and whether to, displace certain SD streams onto other RF carriers. Process 900 provided one example of a refined process for calculating cost metrics in the course of performing the steps of process 600. Process 900 provided what may be termed a 'donor selection' process with respect to half-QAMs having their SD streams displaced into other RF carriers. In a complement to process 900, FIG. 11 presents a process 1100 for determining the best available bandwidth resource for accommodating each displaced SD stream. For example, in the scenario presented in FIG. 8, processes 600 and 900 establish that the three SD streams occupying the upper half QAM of RF channel 16 are to be displaced, but then there is the matter of whether specific ones of these SD streams are better suited to go into specific ones of the available bandwidth slots among RF channels 17 and 18.

Process 1100 is provided in recognition that there may be an advantage to matching a displaced 'donor' stream with the existing traffic in another carrier that has similar hold times and displacement costs. This process seeks to minimize SD displacements by grouping together, in the same carrier, streams that have similar 'hold times'. This increases the likelihood of spontaneous freeing of bandwidth to reduce the probability of subsequent displacements.

To appreciate the value of this, one is reminded that it is generally desirable to minimize disruption due to re-tuning events. If streams having typically short 'hold times' can be grouped together into the same carrier, then the likelihood is greater that a half-QAM sized resource will spontaneously open up thereby averting the need to displace any streams when a new request comes along. This practice is preferable to mixing long-hold time/high value programs and sporadically viewed programs on the same carrier or half-QAM (or at least more than five long-hold-time SD programs per carrier). The likelihood that a resource will become free can be impacted by a single, more persistently viewed program.

Keeping fewer than five long-hold-time SD streams on a carrier even further improves these chances. For instance, a mixture of three long-hold programs plus a bunch of short-hold programs still provides plenty of opportunity for a half-QAM resource to spontaneously become available within a reasonable time.

Figure 11:
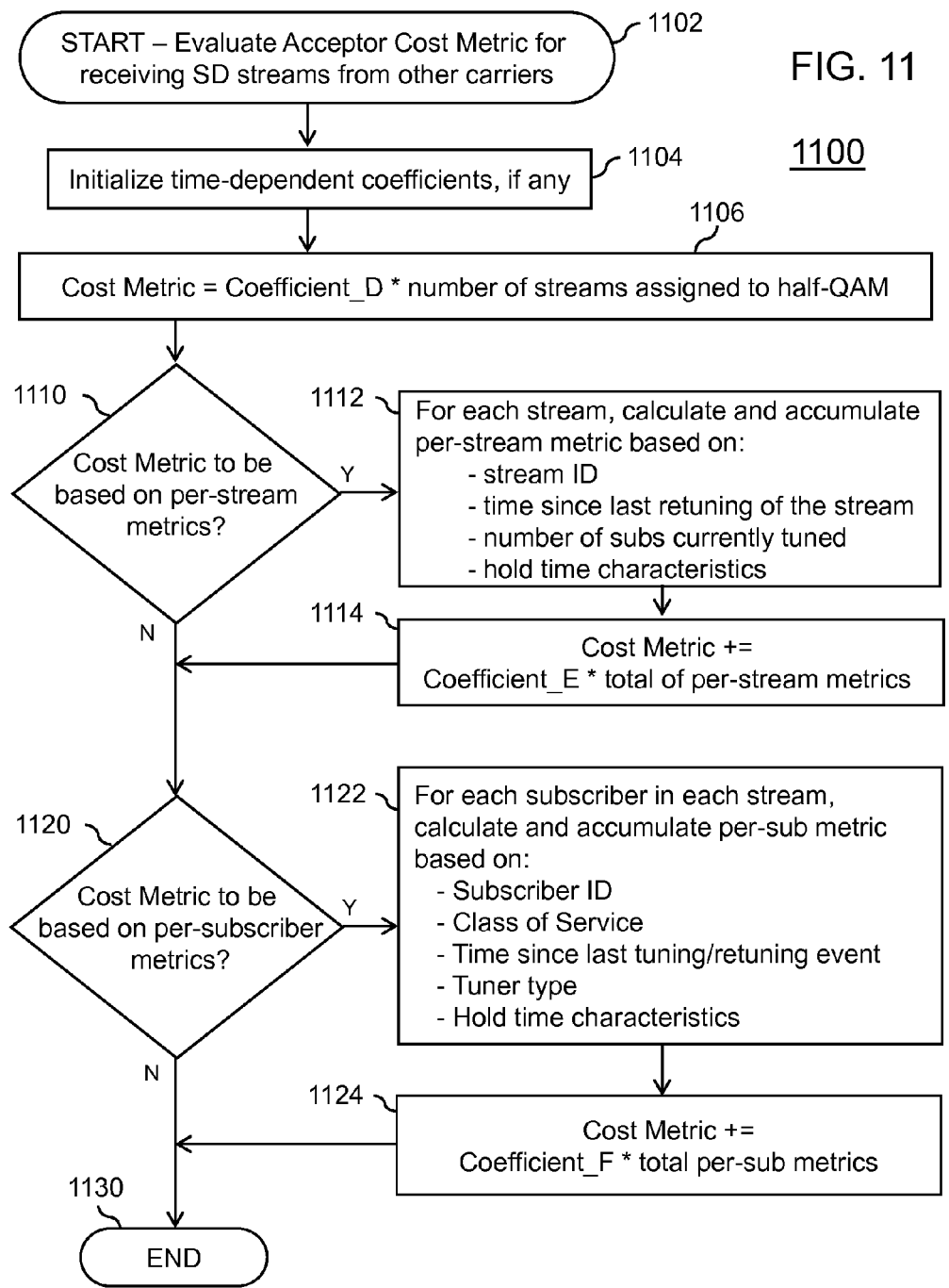
FIG. 11 is a flowchart describing a process, in accordance with a preferred embodiment of the present invention, for evaluating suitability of a carrier having unused bandwidth to accept a stream currently assigned to another carrier.

FIG. 11 depicts a process 1100 for calculating a 'cost metric' (or, in this context, more aptly termed a 'suitability indicator') for evaluating a half-QAM as a candidate to receive displaced SD streams. In the steps below involving iteration through currently carried SD streams, the process may consider all of the SD streams currently carried by the RF carrier (the whole QAM carrier) or only those streams considered to be a part of a conceptual half-QAM as depicted in FIG. 7. (In reality, a given stream is simply assigned to an RF carrier, not to a particular half-QAM.)

Process 1100 commences in step 1102 upon the need to evaluate the relative suitability of an empty or partially filled half-QAM for receiving SD streams displaced from other carriers. Process 1100 proceeds to step 1104 where any of the coefficients in later steps in this process that are time dependent are initialized based on the time the process is executed. In step 1106, a cost metric is initially calculated based solely on the number of streams presently assigned to the candidate half-QAM. The number of streams is multiplied by 'Coefficient_D', which is a coefficient that may be configured by the service provider to control the amount of influence that the occupancy level of the QAM has in deciding whether the QAM is a good receiver for displaced SD streams.

Execution then proceeds to step 1110 to determine whether the 'acceptor' cost metric being calculated by process 1100 is to take into consideration any per-stream parameters or statistics. This determination may simply be an explicit setting that the service provider can control. Alternatively, the service provider can simply set the value of Coefficient_E to zero and this may be detected by processing logic to provide an "early out" to avoid unnecessarily calculating per-stream metrics in step 1112. If per-stream metrics are to be taken into account as determined in step 1110, then execution proceeds with step 1112 in which, for each stream presently carried by the half-QAM resource, a per-stream metric is calculated based on one or more of the following: the stream ID, elapsed time since the last re-tuning of the stream, the number of subscribers currently tuned to the stream, and hold time characteristics. This latter parameter relates to average hold time and the likelihood that the given stream will be vacated by most of the subscribers within a given time frame. Taking hold time characteristics into account gives the service provider a better chance for having QAM resources spontaneously free up due to viewer attrition. As explained above, the service provider may find benefit, on average, by grouping together SD streams that have similar hold time characteristics.

After per-stream metrics are calculated and accumulated in step 1112, then the per-stream metrics are added to the overall cost metric weighted by a factor, Coefficient_E, that is controllable by the service provider.

Whether or not per-stream metrics are considered based on the decision of step 1110, process execution then proceeds to step 1120. In step 1120, the determination is made as to whether the cost metrics are to take into account per-subscriber metrics. If not, then execution proceeds to step 1130 and the process is concluded having calculated a relative cost metric related to evaluating the suitability of the candidate half-QAM to receive the displaced SD streams. Otherwise if, in step 1120, per-subscriber metrics are to be taken into account, then execution proceeds to step 1122. In step 1122, a metric is evaluated and accumulated for each subscriber in each stream currently being carried by the given half QAM under consideration. In calculating the per-subscriber metric, examples of data that may be used in the calculation includes the subscriber ID, the class of service for the subscriber, elapsed time since the subscriber experienced the tuning or re-tuning event, the type of tuner that the user has, and statistics related to the hold time behavior of the subscriber which may well be a function of the channel being tuned, the time of day, etc. Next, in step 1124, the cumulative metrics for all subscribers in all streams currently served by the half-QAM are added to the overall cost metric after being multiplied by a Coefficient_F. Coefficient_F may be adjusted by the service provider to control the relative influence of per-subscriber metrics versus the influence of per-stream metrics or the sheer number of streams assigned to the candidate half-QAM. After per-subscriber metrics are combined into the overall cost metric, then process 1100 proceeds to step 1130 and is concluded. The resulting cost metric associate with an 'acceptor' half-QAM may be compared to a 'donor' metric for a specific SD stream that is being displaced from another RF carrier. As with process 900 described earlier, process 1100 may be optionally be performed in the course of performing steps 610 or 630 in process 600.

One approach for matching a list of donor streams to a list of acceptor bandwidth resources would be to sort both by their respective cost metrics/suitability values and simply pair off donor-to-acceptor starting from one end of the list. Another approach would be to evaluate the average of each list and align the two lists on that basis. This can be used, for example, if the lowest member of one list is too much of a mismatch for the lowest member of the other list. Lists may also be aligned to minimize 'distances' or 'squared differences' between values before pairing streams to channels. Finally, where one elects to perform only donor selection but not acceptor selection, the procedure is simply to mete out the streams in order of donor ranking but each stream can go to any available bandwidth resource, perhaps influenced only by the sort order of step 610. Likewise, acceptor selection can rank acceptors to be employed preferentially, but the choice of which displaced donor is assigned to the resource is less critical.

A service provider may decide whether to implement logic that, under extreme loads, allows SD streams to be displaced into carriers that are designated as SD-only. If this approach is taken, then it is considered advisable to be highly selective in placing SD streams having certain cost values or characteristic hold times into such slots because, once in place, the stream is, in effect, sheltered from consideration to be displaced or preempted in favor of HD streams.

Figure 12:
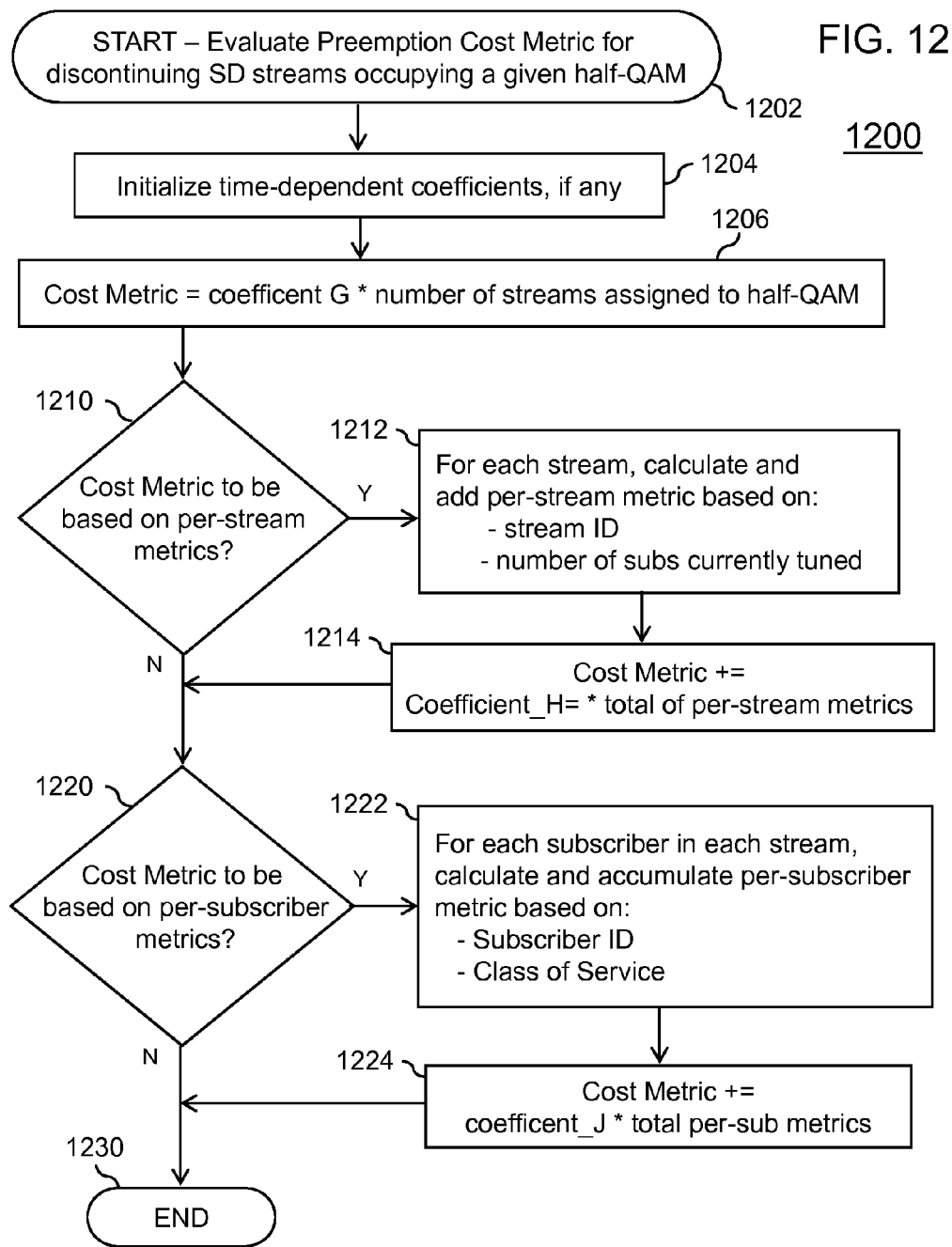
FIG. 12 is a flowchart describing a process, in accordance with a preferred embodiment of the present invention, for evaluating the suitability of a carrier resource to have assigned streams discontinued.

In the detailed description provided thus far, the main scenarios that have been described involve standard-definition streams that are to be displaced and other RF carriers that have unused bandwidth to accommodate the displaced standard-definition streams. During heavy viewership loads, it is possible that the video distribution network may be pushed to the limits of its capacity and the service provider may be confronted with a choice between denying a new program request or discontinuing some SD streams in favor of the new program request. This issue was addressed briefly in connection with steps 614 through 620 of process 600. The analysis of whether or not to preempt presently active streams in favor of accommodating any new request may be sophisticated, taking into account the impact of such preemption on viewers and on their perception of the quality of service they are receiving. Accordingly, FIG. 12 shows a process 1200 for assessing the relative cost of preempting streams within a given half-QAM. When the possibility of preemption is considered, the calculation performed by process 1200 provides a relative measure for determining which half-QAM would result in the lowest impact if all of the SD streams within them were to be discontinued. Of course, this cost metric could also be used in deciding whether a combination of displacement and preemption may be used to accommodate a new request. The cost metric calculated by process 1200, when applied to specific streams, may assist in the selection of which specific SD streams are to be displaced versus those that are to be preempted.

Process 1200 commences in step 1202 upon the need to evaluate the relative cost of discontinuing all SD streams for a particular half-QAM. This cost can be related to such real-world factors as impact to quality of service as perceived by users or interruption of revenue-bearing streams tied to subscriber and advertiser revenues. Process 1200 proceeds to step 1204 where any of the coefficients in later steps in this process that are time dependent are initialized based on the time the process is executed. In step 1206, a cost metric is initially calculated based solely on the number of streams presently assigned to the candidate half-QAM. The number of streams is multiplied by 'Coefficient_G', which is a coefficient that may be configured by the service provider to control the amount of influence that the occupancy level of the half-QAM has in deciding whether the half-QAM can be entirely preempted.

Execution then proceeds to step 1210 to determine whether the preemption cost metric being calculated by process 1200 is to take into consideration any per-stream parameters or statistics. This determination may simply be an explicit setting that the service provider can control. Alternatively, the service provider could just set the value of Coefficient_H to zero and this may be detected by processing logic to provide an "early out" to avoid unnecessarily calculating per-stream metrics in step 1212. If per-stream metrics are to be taken into account as determined in step 1210, then execution proceeds with step 1212 in which, for each stream presently carried by the half-QAM resource, a per-stream metric is calculated based on the stream ID and/or the number of subscribers currently tuned to the stream. After per-stream metrics are calculated and accumulated in step 1112, then the per-stream metrics are added to the overall cost metric weighted by a factor, Coefficient_H, that is controllable by the service provider.

Whether or not per-stream metrics are considered based on the decision of step 1210, process execution then proceeds to step 1220. In step 1220, the determination is made as to whether the cost metrics are to take into account per-subscriber metrics. If not, then execution proceeds to step 1230 and the process is concluded having calculated a relative cost metric related to evaluating the suitability of the candidate half-QAM to have all of its SD streams preempted. Otherwise if, in step 1220, per-subscriber metrics are to be taken into account, then execution proceeds to step 1222. In step 1222, a metric is evaluated and accumulated for each subscriber in each stream currently being carried by the given half-QAM under consideration. In calculating the per-subscriber metric, examples of data that may be used in the calculation includes the subscriber ID and the class of service for the subscriber. Next, in step 1224, the cumulative metrics for all subscribers in all streams currently served by the half-QAM are added to the overall cost metric after being multiplied by a Coefficient_J. Coefficient_J may be adjusted by the service provider to control the relative influence of per-subscriber metrics versus the influence of per-stream metrics or the sheer number of streams assigned to the candidate half-QAM. After per-subscriber metrics are combined with into the overall cost metric, then process 1200 proceeds to step 1230 and is concluded. The resulting preemption cost metric may be compared to that of other half-QAMs in the course of decision making as to which of many half-QAMs is a best candidate for preemption. Where mixed preemption/displacement solutions are allowed, a similar process (especially steps 1212 and 1222) may be applied to single streams as part of a comparison among streams to find streams that result in least impact if preempted.

In view of the foregoing description, it may now be appreciated that any of the evaluation processes 900, 1100 or 1200 can be usefully applied in step 610 to even more finely rank the SD streams assigned to a given RF carrier. This additional sorting prior to assembling a subset list of available half-QAMs of the type shown in FIG. 7 can ensure that the most fluid or displaceable SD streams within each carrier are the ones that enter into consideration to be displaced or to be grouped with others of similar hold time characteristics. For example, RF carrier 17 in FIG. 5B may well be carrying two or three long-hold-time SD streams, but by the operation of this stream-wise ranking logic in each QAM before building the list of half-QAMs, these streams are simply considered to be a part of the conceptual lower half of the QAM resource which is excluded from further consideration.

Any or all of processes 600, 900, 1100 and 1200 may be performed or hosted by various elements shown in FIG. 1, such as SBM 150, SVA 160 or edge switching function 130. Any device of this type that embodies the processes or performs the signaling according to the present teachings amounts to a novel device that accomplishes improved coordination of the use of carrier resources.

Figure 13:
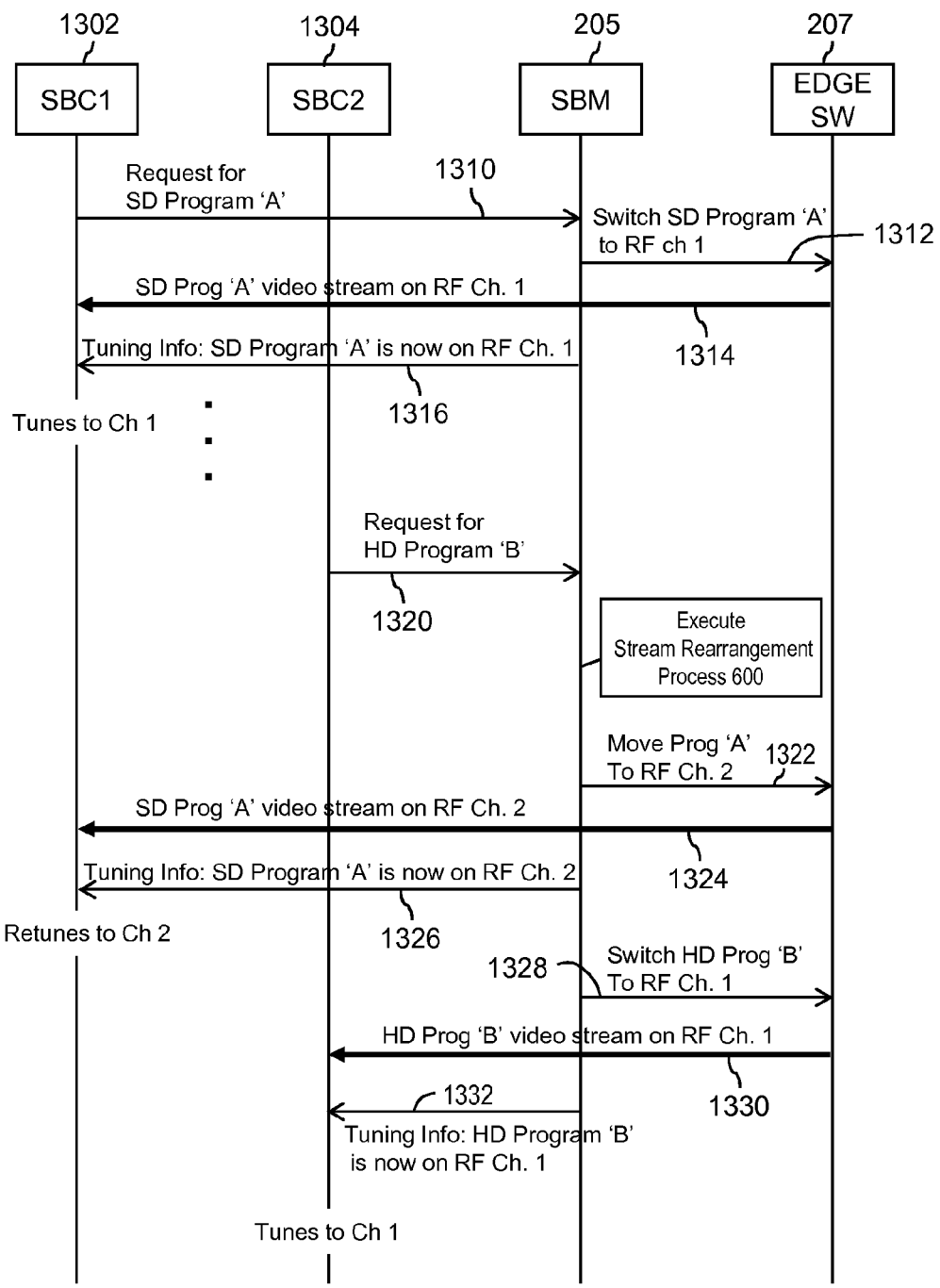
FIG. 13 is a diagram of messaging flow between entities to accomplish displacement of an SD stream from one RF carrier to another in accordance with a preferred embodiment of the present invention.

FIG. 13 is a messaging flow diagram depicting the interaction among entities in conjunction with SD stream displacement actions in accordance with the preferred embodiment of the present invention. In FIG. 13, four entities are shown as follows: a first switched broadcast client 1302 (SBC1), a second switched broadcast client 1304 (SBC2), a switched broadcast manager 205 and an edge switching device 207. The last two elements were introduced earlier in conjunction with FIG. 2. Much of the first half of FIG. 13 is comparable to FIG. 2, although some finer steps have been eliminated for simplicity. The switched broadcast clients represent two different receivers, such as set top boxes in two different households within the same service group of a cable network. In the scenario of FIG. 13, the first SBC 1302 makes a request to view a standard-definition program. Some time after the first SBC 1302 has begun receiving the requested program, the second SBC 1304 sends a request to receive a high-definition program.

The initial request by SBC1 to view SD Program 'A' is reflected in message 1310 which is a request sent via an upstream, perhaps out-of-band, channel to SBM 205. As explained earlier connection with FIG. 2, this message identifies the set-top box making the request as well as a specifier for the requested program. Responsive to the request, SBM 205 may issue a command (message 1312) to edge switching device 207 to cause Program 'A' to be switched onto RF Channel '1'. Message 1312 may not be necessary if the SBM 205 determines that Program 'A' is already present on a RF channel serving SBC1. For example, SD Program 'A' may already be present on RF Channel '1' or some other channel due to previous requests by other subscribers in the same service group as SBC1.

The flow of the video stream carrying Program 'A' on RF Channel 1 is represented by arrow 1314 in this diagram. Once the video stream is present on the RF channel, then the tuning parameters are relayed to SBC1 from the SBM 205 in message 1316 so that SBC1 knows where to find the requested program. As indicated, SBC1 then tunes to RF channel '1' (as well as the particular PID for the program) and begins presenting the program to the end user who is coupled through SBC1.

Sometime after this initial selection and tuning of SD Program 'A' for SBC1, a subsequent request 1320 is received from a different device SBC2. Request 1320 is sent to SBM 205 indicating that a user desires to receive a high-definition program 'B'.

At this point, SBM 205 or some other entity shown in the network architecture of FIG. 1, may execute a process to determine how to best accommodate the new request for the high-definition stream. In the case where dedicated high-definition bandwidth resources are not readily available, a stream rearrangement process, such as process 600 and, optionally, supportive processes 900, 1100 and 1200, may be executed to decide whether and how to reallocate RF carrier resources to handle the existing and newly requested streams.

In accordance with a preferred embodiment of the present invention, a course of action may be represented by the remainder of the messaging steps shown in FIG. 13 wherein edge switching device 207 is instructed in step 1322 to move SD Program 'A' to RF channel 2 as a result of the stream rearrangement decision making process. The enactment of this decision is represented by the presence of Program 'A' now on RF channel 2 (1324). In accordance with a preferred embodiment of the present invention, a message 1326 conveying new tuning parameters is sent from SBM 205 to SBC1 (1302) instructing SBC1 to re-tune to continue receiving Program 'A'. Roughly concurrently with message 1322, SBM 205 also issues an instruction (1328) to edge switching device 207 to switch HD Program 'B' onto RF channel '1'. Edge switching function 207 complies by delivering HD Program 'B' video stream on RF Channel 1 (1330). Finally, SBC2 1304 is informed of the tuning parameters in message 1332 and proceeds to then find HD Program 'B' on RF channel '1'. The net effect is a displacement of SD Program 'A' to accommodate HD Program 'B'.

Similar to the scenarios in FIGS. 5B and 5C, SD Program 'A' being viewed at one location may have been among other SD streams on RF channel 1 that were displaced to make room for an HD Program 'B' requested via SBC2. Furthermore, many other end users, not shown, may have also been watching Program 'A' when it was moved from RF channel 1 to RF channel 2, so each of their receivers would need to be informed, either by direct communication or by a broadcast protocol, of the shift in where to obtain Program 'A'.

FIG. 13 thus describes the steps of receiving a first request from a first receiver to receive a first digital media stream (1310), the first digital media stream having a first bandwidth (standard-definition), sending to the first receiver a first digitally modulated carrier signal that is modulated with the first digital media stream (1314), sending to the first receiver an identifier of the first digitally modulated carrier signal (tuning parameters in message 1316), receiving a second request from a second receiver to receive a second digital media stream (1320), the second digital media stream having a second bandwidth (HD) greater than the first bandwidth (SD), determining that transmitting the second digital media stream requires bandwidth of the first digitally modulated carrier signal that is presently occupied in transmitting the first digital media stream (process 600, for example), sending to the first receiver a second digitally modulated carrier signal that is modulated with the first digital media stream (1324), sending to the first receiver an identifier of the second digitally modulated carrier signal as carrying the first digital media stream (tuning parameters in message 1326), sending to the second receiver the first digitally modulated carrier signal that is modulated with the second digital media stream (1330), and sending to the second receiver an identifier of the first digitally modulated carrier signal as carrying the second digital media stream (1332).

FIG. 14 is an exemplary configuration of a device 1400 that may correspond to any of a set-top box, edge switching function 130, SBM 150/205, SVA 160, and/or edge switching device 207. Referring to FIG. 14, device 1400 may include a bus 1410, a processor 1420, main memory 1430, read only memory (ROM) 1440, a storage device 1450, an input device 1460, an output device 1470, and a communication interface 1480. Bus 1410 may include a path that permits communication among the elements of device 1400.

Processor 1420 may include a processor, microprocessor, or processing logic that may interpret and execute instructions. Memory 1430 may include a random access memory (RAM) or another type of dynamic storage device that may store information and instructions for execution by processor 1420. ROM 1440 may include a ROM device or another type of static storage device that may store static information and instructions for use by processor 1420. Storage device 1450 may include a magnetic and/or optical recording medium and its corresponding drive.

Input device 1460 may include a mechanism that permits an operator to input information to device 1400, such as a keyboard, a mouse, a pen, voice recognition and/or biometric mechanisms, etc. Output device 1470 may include a mechanism that outputs information to the operator, including a display, LED indicators, a speaker, etc. Communication interface 1480 may include any transceiver-like mechanism that device 1400 may use to communicate with other devices and/or systems. For example, communication interface 1480 may include a modem or an Ethernet interface to a LAN. Alternatively, communication interface 1480 may include other mechanisms for communicating via a network, such as network 120 or network 135.

Device 1400 may perform processing associated with identifying and reassigning program streams among two or more digitally modulated carriers as described herein. According to an exemplary implementation, device 1400 may perform these operations in response to processor 1420 executing sequences of instructions contained in a computer-readable medium, such as memory 1430. A computer-readable medium may be defined as a physical or logical memory device. A logical memory device may refer to memory space within a single, physical memory device or spread across multiple, physical memory devices. The software instructions contained in memory 220 may cause control unit 210 to perform processes that will be described later. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 23 and 24, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. Where example processes have been shown herein using a set of 'steps', those of ordinary skill in the art will understand that the 'steps' may not have to be performed in the particular order shown. The examples shown are not intended to limit the present invention to a particular sequencing, grouping or partitioning of execution of the steps.

What is claimed is:

1. A method comprising:
   receiving, by a device, a request from a first client for a first media stream;
   determining, by the device, a cost metric for displacing a second media stream based on a time-dependent coefficient and a quantity of streams assigned to a half-quadrature amplitude modulated (QAM) associated with the second media stream;
   determining, by the device and based on the cost metric for displacing the second media stream, a ranking of half-QAMs that include the half-QAM;
   determining, by the device and based on the ranking, that transmitting the first media stream requires use of bandwidth that is occupied in transmitting the second media stream using a first carrier signal of the half-QAM;
   sending, by the device and to an edge switching device, a first signal to move the second media stream to a second carrier signal;
   sending, by the device and to a second client associated with the second media stream, a first message instructing the second client to tune to the second carrier signal to continue receiving the second media stream;
   sending, by the device and to the edge switching device, a second signal to transmit the first media stream by using the first carrier signal; and
   sending, by the device and to the first client, a second message identifying the first carrier signal for the first client to receive the first media stream while the second client receives the second media stream.

2. The method of claim 1, further comprising:
   determining the bandwidth required for the first media stream; and
   identifying the half-QAMs as half-QAMs that have the bandwidth required for the first media stream.

3. The method of claim 1, where determining that transmitting the first media stream requires use of the bandwidth that is occupied in transmitting the second media stream comprises:
   selecting the first carrier signal for the first media stream based on the ranking.

4. The method of claim 1, further comprising:
   obtaining characteristics of each subscriber associated with the second media stream.

5. The method of claim 4, where determining the cost metric is further based on the characteristics of each subscriber associated with the second media stream.

6. The method of claim 1,
   where the first message includes an identifier of the second carrier signal carrying the second media stream, and
   where the second message includes an identifier of the first carrier signal carrying the first media stream.

7. The method of claim 1, further comprising:
   sending, via the edge switching device and to the second client, the second carrier signal that is modulated with the second media stream; and
   sending, via the edge switching device and to the first client, the first carrier signal that is modulated with the first media stream.

8. The method of claim 1,
where the first media stream is a high-definition (HD) stream, and
where the second media stream is a standard-definition (SD) stream.

9. The method of claim 1, where the device comprises one or more of:
a switched broadcast manager (SBM), or
a switched video analysis (SVA) server.

10. The method of claim 1, where determining that transmitting the first media stream requires use of the bandwidth that is occupied in transmitting the second stream is conducted in real time.

11. A system comprising:
one or more processors to:
receive, from a first client, a request for a first media stream;
determine a cost metric for displacing a second media stream based on a time-dependent coefficient and a quantity of streams assigned to a half-quadrature amplitude modulated (QAM) associated with the second media stream;
determine, based on the cost metric for displacing the second media stream, a ranking of half-QAMs that include the half-QAM;
determine, based on the ranking, that transmitting the first media stream requires use of bandwidth of a first carrier signal, of the half-QAM, that is occupied in transmitting the second media stream;
send, to an edge switching device, a first signal to move the second media stream from the first carrier signal to a second carrier signal;
send, to a second client associated with the second media stream, a first message instructing the second client to tune to the second carrier signal to continue receiving the second media stream;
send, to the edge switching device, a second signal to transmit the first media stream by using the first carrier signal; and
send, to the first client, a second message identifying the first carrier signal for the first client to receive the first media stream while the second client receives the second media stream.

12. The system of claim 11, where the one or more processors are further to:
determine the bandwidth required for the first media stream, and
identify the half-QAMs as half-QAMs that have the bandwidth required for the first media stream.

13. The system of claim 11, where the device is a switched broadcast manager (SBM).

14. A method comprising:
receiving, by one or more devices, a request to transmit a particular media stream to a particular client,
the particular media stream requiring bandwidth of a first type of block from a first carrier signal of a plurality of carrier signals;
determining, by one or more devices, that the first type of block from the first carrier signal is not available;
identifying, when the first type of block is not available, second type of blocks of the first carrier signal that are being used for one or more other streams;
determining, by the one or more devices, a cost metric for displacing the one or more other streams based on a time-dependent coefficient and a quantity of the one or more other streams;
determining, by the one or more devices and based on the cost metric, a ranking associated with a half-quadrature amplitude modulated (QAM)s that includes the second type of blocks;
switching, by the one or more devices and based on the ranking, the one or more other streams from the first carrier signal to a second carrier signal of the plurality of carrier signals to create the bandwidth of the first type of block;
sending, by the one or more devices and to one or more other clients associated with the one or more other streams, a first message instructing the one or more other clients to tune to the second carrier signal to continue receiving the one or more other streams; and
sending, by the one or more devices and to the particular client, a second message identifying the first carrier signal for the particular client to receive the particular media stream while the one or more other clients receive the one or more other streams.

15. The method of claim 14,
where the first type of block includes bandwidth sufficient to carry a high-definition (HD) video stream, and
where a particular block, of the second type of blocks, includes bandwidth sufficient to carry a standard-definition (SD) video stream.

16. The method of claim 14, where the half-QAM has at least one coarse resource block or at least five fine resource blocks.

17. The method of claim 14,
where the first message includes an identifier of the second carrier signal, and
where the second message includes an identifier of the first carrier signal.

18. A method comprising:
receiving, by one or more devices and from a first client, a request to receive a first media stream;
determining, by the one or more devices, a cost metric for displacing a second media stream based on viewership information associated with the second media stream and a quantity of streams assigned to a half-quadrature amplitude modulated (QAM) associated with the second media stream;
determining, by the one or more devices and based on the cost metric, a ranking of half-QAMs that include the half-QAM;
determining, by the one or more devices and based on the ranking, that transmitting the first media stream requires use of a first modulated carrier signal, of the half-QAM, that is presently occupied in transmitting the second media stream to a second client;
sending, by the one or more devices and to the second client, a second modulated carrier signal that is modulated with the second media stream;
sending, by the one or more devices and to the second client, a first message instructing the second client to tune to the second modulated carrier signal to continue receiving the second media stream;
sending, by the one or more devices and to the first client, the first modulated carrier signal that is modulated with the first media stream; and
sending, by the one or more devices and to the first client, a second message identifying the first modulated carrier signal for the first client to receive the first media stream while the second client receives the second media stream.

19. The method of claim 18, further comprising:
determining a first bandwidth required for the first media stream,
the first bandwidth being greater than a second bandwidth that is required to transmit the second media stream, and
identifying the half-QAMs as half-QAMs that have the first bandwidth required for the first media stream.

20. The method of claim 18, where determining that transmitting the second media stream requires use of bandwidth of the first modulated carrier signal comprises:
selecting the second modulated carrier signal based on the ranking.

21. A non-transitory computer-readable medium storing instructions, the instructions comprising:
one or more instructions that, when executed by one or more processors, cause the one or more processors to:
receive a request from a first client to send a first stream;
determine a cost metric for displacing one or more streams from a first carrier signal based on a time-dependent coefficient and a quantity of streams assigned to a half-quadrature amplitude modulated (QAM) that includes the one or more streams, the one or more streams including a second stream;
determine, based on the cost metric, a ranking of half-QAMs that include the half-QAM;
determine, based on the ranking, that transmitting the first stream will require use of the first carrier signal associated with the half-QAM;
send, to a second client, a second carrier signal that is modulated with the second stream;
send, to the second client, a first message instructing the second client to tune to the second carrier signal to continue receiving the second stream;
send, to the first client, the first carrier signal that is modulated with the first stream; and
send, to the first client, a second message identifying the first carrier signal for the first client to receive the first stream while the second client receives the second stream.

22. The non-transitory computer-readable medium of claim 21,
where the first stream is a standard-definition (SD) stream, and
where the second stream is a high-definition (HD) stream.

23. The non-transitory computer-readable medium of claim 21, where the one or more instructions to send the first carrier signal that is modulated with the first stream include:
one or more instructions that, when executed by one or more processors, cause the one or more processors to:
send, to an edge switching device, a command to transmit the first stream to the first client by using the first carrier signal.

24. The non-transitory computer-readable medium of claim 21, where the one or more instructions to determine the cost metric comprise:
one or more instructions that, when executed by one or more processors, cause the one or more processors to:
determine the cost metric based on the time-dependent coefficient, the quantity of streams assigned to the half-QAM, and a quantity of viewers currently tuned to the one or more streams.

25. The system of claim 11, where, when determining the cost metric, the one or more processors are to:
determine the cost metric based on the time-dependent coefficient, the quantity of streams assigned to the half-QAM, and subscriber information associated with the second stream.

\* \* \* \* \*